(12) United States Patent
Pahud et al.

(10) Patent No.: US 10,289,239 B2
(45) Date of Patent: May 14, 2019

(54) APPLICATION PROGRAMMING INTERFACE FOR MULTI-TOUCH INPUT DETECTION

(71) Applicant: Microsoft Technology Licensing, LLC, Redmond, WA (US)

(72) Inventors: Michel Pahud, Kirkland, WA (US); William Buxton, Toronto (CA); Kenneth P. Hinckley, Redmond, WA (US); Andrew M. Webb, Redmond, WA (US); Eyal Ofek, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/376,436

(22) Filed: Dec. 12, 2016

(65) Prior Publication Data
US 2017/0090666 A1 Mar. 30, 2017

Related U.S. Application Data

(63) Continuation-in-part of application No. 14/963,102, filed on Dec. 8, 2015.
(Continued)

(51) Int. Cl.
*G06F 3/01* (2006.01)
*G06F 3/041* (2006.01)
(Continued)

(52) U.S. Cl.
CPC .......... *G06F 3/0416* (2013.01); *G06F 1/163* (2013.01); *G06F 3/014* (2013.01); *G06F 3/017* (2013.01);
(Continued)

(58) Field of Classification Search
CPC ........ G06F 3/0383; G06F 3/014; G06F 3/017; G06F 3/0346; G06F 3/0416;
(Continued)

(56) References Cited

U.S. PATENT DOCUMENTS 6,125,197 A  9/2000  Mack et al.
7,731,364 B2  6/2010  Peyman
(Continued)

FOREIGN PATENT DOCUMENTS

WO  WO9940562 A1  8/1999
WO  WO0203316 A1  1/2002
(Continued)

OTHER PUBLICATIONS

Klinker et al., "Using a Color Reflection Model to Separate Highlights from Object Color", in the Proceedings of the IEEE International Conference on Computer Vision, vol. 87, Jun. 1987, 11 pages.
(Continued)

*Primary Examiner* — Olga V Merkoulova
*Assistant Examiner* — Jarurat Suteerawongsa
(74) *Attorney, Agent, or Firm* — Schwegman Lundberg & Woessner, P.A.

(57) ABSTRACT

A sensing device, such as a user-wearable device (UWD) worn by a user of a touchscreen, may provide kinematic data of the sensing device or UWD and/or identification data of the user to a processor that operates the touchscreen. Such data may allow the processor to perform a number of user-touchscreen interactions, such as displaying user-specific windows or menus, processing user-manipulation of displayed objects, and determining which hand of a user performs a touch event, just to name a few examples.

19 Claims, 10 Drawing Sheets

Related U.S. Application Data

(60) Provisional application No. 62/190,727, filed on Jul. 9, 2015.

(51) Int. Cl.
  *G06F 1/16* (2006.01)
  *G06F 3/0488* (2013.01)
  *G06F 3/038* (2013.01)
  *G06F 3/0484* (2013.01)
  *G06F 3/0346* (2013.01)

(52) U.S. Cl.
  CPC .......... *G06F 3/0346* (2013.01); *G06F 3/0383* (2013.01); *G06F 3/0488* (2013.01); *G06F 3/04845* (2013.01); *G06F 2203/0381* (2013.01); *G06F 2203/0384* (2013.01); *G06F 2203/04104* (2013.01); *G06F 2203/04106* (2013.01)

(58) Field of Classification Search
  CPC .............. G06F 3/04845; G06F 3/0488; G06F 2203/0381; G06F 2203/0384; G06F 2203/04106; G06F 1/163; G06F 2203/04104; G06F 3/01
  See application file for complete search history.

(56) References Cited

U.S. PATENT DOCUMENTS

| | | | |
|---|---|---|---|
| 7,889,195 B2 | 2/2011 | Shih et al. | |
| 8,203,502 B1 | 6/2012 | Chi et al. | |
| 8,381,135 B2 | 2/2013 | Hotelling et al. | |
| 8,515,128 B1 | 8/2013 | Hildreth | |
| 8,576,073 B2 | 11/2013 | Mooring et al. | |
| 8,760,426 B1 | 6/2014 | Strand et al. | |
| 9,172,996 B2 | 10/2015 | Igoe et al. | |
| 2002/0024500 A1 | 2/2002 | Howard | |
| 2002/0128864 A1* | 9/2002 | Maus .................. | G06F 19/3406 705/2 |
| 2003/0095109 A1 | 5/2003 | Sasaki et al. | |
| 2008/0192059 A1 | 8/2008 | Kennedy | |
| 2009/0146947 A1 | 6/2009 | Ng | |
| 2009/0243998 A1 | 10/2009 | Wang | |
| 2009/0245591 A1 | 10/2009 | Rowe et al. | |
| 2009/0322671 A1 | 12/2009 | Scott et al. | |
| 2010/0199232 A1 | 8/2010 | Mistry et al. | |
| 2010/0238138 A1 | 9/2010 | Goertz et al. | |
| 2011/0134114 A1 | 6/2011 | Rais et al. | |
| 2011/0138277 A1 | 6/2011 | Grant et al. | |
| 2011/0173204 A1* | 7/2011 | Murillo .................. | G06F 3/017 707/741 |
| 2011/0199296 A1 | 8/2011 | Simpson | |
| 2011/0199335 A1 | 8/2011 | Li | |
| 2011/0210931 A1 | 9/2011 | Shai | |
| 2011/0267265 A1 | 11/2011 | Stinson | |
| 2011/0296357 A1 | 12/2011 | Kim | |
| 2012/0025945 A1 | 2/2012 | Yazadi et al. | |
| 2012/0075086 A1 | 3/2012 | Takasu | |
| 2012/0104284 A1 | 5/2012 | Verschuren | |
| 2012/0113062 A1 | 5/2012 | Briden et al. | |
| 2012/0117514 A1 | 5/2012 | Kim et al. | |
| 2012/0176655 A1 | 7/2012 | Shirakura | |
| 2012/0206414 A1 | 8/2012 | Tada et al. | |
| 2012/0224093 A1 | 9/2012 | Chou | |
| 2012/0236025 A1 | 9/2012 | Jacobsen et al. | |
| 2012/0242586 A1 | 9/2012 | Krishnaswamy et al. | |
| 2012/0262407 A1* | 10/2012 | Hinckley .............. | G06F 3/038 345/173 |
| 2013/0135260 A1 | 5/2013 | Damhaug et al. | |
| 2013/0278631 A1 | 10/2013 | Border et al. | |
| 2013/0285941 A1* | 10/2013 | Sugiura .................. | G06F 3/017 345/173 |
| 2013/0290427 A1 | 10/2013 | Proud | |
| 2013/0328928 A1 | 12/2013 | Yamagishi et al. | |
| 2014/0028550 A1 | 1/2014 | Adhikari | |
| 2014/0035736 A1 | 2/2014 | Weddle et al. | |
| 2014/0098018 A1 | 4/2014 | Kim et al. | |
| 2014/0160078 A1 | 6/2014 | Seo et al. | |
| 2014/0173921 A1 | 6/2014 | Gros et al. | |
| 2014/0240103 A1 | 8/2014 | Lake et al. | |
| 2014/0240242 A1 | 8/2014 | Kawalkar et al. | |
| 2014/0240708 A1 | 8/2014 | Matsushita et al. | |
| 2014/0267169 A1 | 9/2014 | Mckiel, Jr. | |
| 2015/0022438 A1 | 1/2015 | Hong | |
| 2015/0026647 A1 | 1/2015 | Park et al. | |
| 2015/0031333 A1 | 1/2015 | Lee | |
| 2015/0032418 A1 | 1/2015 | Akiyama et al. | |
| 2015/0067824 A1 | 3/2015 | Chatterton et al. | |
| 2015/0074797 A1 | 3/2015 | Choi et al. | |
| 2015/0177947 A1 | 6/2015 | Shen et al. | |
| 2015/0185850 A1 | 7/2015 | Guilak et al. | |
| 2015/0242015 A1* | 8/2015 | Cho ....................... | G06F 3/044 345/174 |
| 2015/0261373 A1* | 9/2015 | Smus .................... | G06F 3/0416 345/174 |
| 2015/0293592 A1 | 10/2015 | Cheong et al. | |
| 2016/0018900 A1 | 1/2016 | Tu et al. | |
| 2016/0085329 A1 | 3/2016 | Yim et al. | |
| 2016/0110012 A1 | 4/2016 | Yim et al. | |
| 2017/0010695 A1 | 1/2017 | Pahud et al. | |
| 2017/0010733 A1 | 1/2017 | Pahud et al. | |
| 2017/0153741 A1 | 6/2017 | Ofek et al. | |

FOREIGN PATENT DOCUMENTS

| | | |
|---|---|---|
| WO | WO2013081818 A1 | 6/2013 |
| WO | WO2014189225 A1 | 11/2014 |

OTHER PUBLICATIONS

PCT Search Report and Written Opinion dated Feb. 15, 2017 for PCT Application No. PCT/US2016/062629, 11 Pages.

PCT Search Report and Written Opinion dated Oct. 28, 2016 for PCT Application No. PCT/US14/040598, 18 Pages.

Govers III, "inTouch Tech Allows Files to be Transferred between Devices with a Touch", retrieved on Jul. 14, 2015, available at <<http://www.gizmag.com/intouch-ring-data-transfer/29486/>>, Nov. 18, 2013, 7 pages.

Houben et al., "WatchConnect: A Toolkit for Prototyping Smartwatch-Centric Cross-Device Applications", in the Proceedings of the Conference on Human Factors in Computing Systems, Apr. 18, 2015, 10 pages.

PCT Search Report and Written Opinion dated Oct. 6, 2016 for PCT Application No. PCT/US2016/040596, 24 Pages.

Ransiri et al., "SmartFinger: Connecting Devices, Objects and People seamlessly", in the Proceedings of the Australian Conference on Human-Computer Interaction, Nov. 25, 2013, 4 pages.

"Touch and Input Sensing for Wearable Devices", retrieved on Jul. 14, 2015, available at: <<http://ww1.microchip.com/downloads/en/DeviceDoc/0000169313.pdf>>, 2 pages.

"Touch and Share Smart Phones", retrieved on Jul. 14, 2015, available at <<http://timesofindia.indiatimes.com/city/chandigarh/Touch-and-share-smart-phones/articleshow/25401132.cms>>, Nov. 8, 2013, 4 pages.

Xu et al., "Finger-Writing with Smartwatch: A Case for Finger and Hand Gesture Recognition using Smartwatch", in the Proceedings of the 16th International Workshop on Mobile Computing Systems and Applications, Feb. 12, 2015, 6 pages.

"Non Final Office Action Issued in U.S. Appl. No. 14/962,895", dated Dec. 7, 2018, 16 Pages.

"Final Office Action Issued in U.S. Appl. No. 14/963,102", dated Jan. 2, 2019, 27 Pages.

"Final Office Action Issued in U.S. Appl. No. 13/644,701", dated Dec. 4, 2014, 29 Pages.

"Final Office Action Issued in U.S. Appl. No. 13/644,701", dated Oct. 3, 2016, 29 Pages.

"Final Office Action Issued in U.S. Appl. No. 13/644,701", dated Oct. 19, 2017, 37 Pages.

(56) References Cited

OTHER PUBLICATIONS

"Non Final Office Action Issued in U.S. Appl. No. 13/644,701", dated Apr. 7, 2017, 41 Pages.
"Non Final Office Action Issued in U.S. Appl. No. 13/644,701", dated Jun. 10, 2014, 23 Pages.
"Non Final Office Action Issued in U.S. Appl. No. 13/644,701", dated Sep. 10, 2015, 31 Pages.
"Non Final Office Action Issued in U.S. Appl. No. 13/644,701", dated Mar. 30, 2016, 28 Pages.
"Non Final Office Action Issued in U.S. Appl. No. 14/956,289", dated Mar. 19, 2018, 25 Pages.
"Final Office Action Issued in U.S. Appl. No. 14/962,895", dated Jun. 19, 2017, 24 Pages.
"Final Office Action Issued in U.S. Appl. No. 14/962,895", dated Jul. 11, 2018, 18 Pages.
"Non Final Office Action Issued in U.S. Appl. No. 14/962,895", dated Mar. 10, 2017, 18 Pages.
"Non-Final Office Action Issued in U.S. Appl. No. 14/962,895", dated Feb. 7, 2018, 25 Pages.
"Final Office Action Issued in U.S. Appl. No. 14/963,102", dated Nov. 17, 2017, 21 Pages.
"Non Final Office Action Issued in U.S. Appl. No. 14/963,102", dated May 17, 2018, 29 Pages.
"Non-Final Office Action Issued in U.S. Appl. No. 14/963,102", dated Apr. 7, 2017, 20 Pages.
Borst, et al., "A Spring Model for Whole-Hand Virtual Grasping", MIT Press, Presence: Teleoperators and Virtual Environments, vol. 15, Issue 1, Feb. 2006, 15 Pages.
Butler, et al., "SideSight: Multi-touch Interaction Around Small Devices", In Proceedings of the 21st Annual ACM symposium on User interface software and technology, Oct. 19, 2008, 4 Pages.
Cipolla, "Hand Tracking Using a Quadric Surface Model", Retrieved From: http://mi.eng.cam.ac.uk/~cipolla/publications/inproceedings/2003-MOS-handtracking.pdf, Retrieved on: Aug. 6, 2012, 13 Pages.
Dang, et al., "Usage and Recognition of Finger Orientation for Multi-Touch Tabletop Interaction", In 13th IFIP TC International Conference on Human-Computer Interaction—vol. Part 111, Sep. 5, 2011, 18 Pages.
Dominguez, et al., "A Robust Finger Tracking Method for Multimodal Wearable Computer Interfacing", In Proceedings of IEEE Transactions on Multimedia, vol. 8, Issue 5, Oct. 2006, 17 Pages.
Gustafson, et al., "Imaginary Phone: Learning Imaginary Interfaces by Transferring Spatial Memory", In Proceedings of the 24th annual ACM symposium on User interface software and technology, Oct. 16, 2011, 10 Pages.
Harrison, et al., "OmniTouch: Wearable Multitouch Interaction Everywhere", In Proceedings of the 24th Annual ACM Symposium on User Interface Software and Technology, Oct. 16, 2011, 10 Pages.
Henderson, Edward Nelson., "An Inertial Measurement System for Hand and Finger Tracking", A thesis Submitted in partial fulfillment of the requirement fort the degree of Master of Science in Electrical Engineering ,Boise State University, Dec. 2011, 217 Pages.
Lee, et al., "Handy AR: Markerless Inspection of Augmented Reality Objects Using Fingertip Tracking", In Proceedings of 11th International Symposium on Wearable Computers, Oct. 11, 2007, 8 Pages.
"International Preliminary Report on Patentability Issued in PCT Application No. PCT/US2013/060233", dated Mar. 13, 2015, 6 Pages.
"International Preliminary Report on Patentability Issued in PCT Application No. PCT/US2016/040596", dated Sep. 15, 2017, 18 Pages.
"Second Written Opinion Issued in PCT Application No. PCT/US2016/040596", dated May 18, 2017, 17 Pages.
"International Preliminary Report on Patentability Issued in PCT Application No. PCT/US2016/040598", dated Jul. 13, 2017, 7 Pages.
Rekimoto, Jun, "GestureWrist and GesturePad: Unobtrusive Wearable Interaction Devices", In Proceedings of 5th IEEE International Symposium on Wearable Computers, Oct. 8, 2001, 7 Pages.
Saponas, et al., "Enabling Always-Available Input With Muscle-Computer Interfaces", In Proceedings of the 22nd annual ACM symposium on User interface software and technology, Oct. 4, 2009, 10 Pages.
Terajima, et al., "Fast Finger Tracking System for In-air Typing Interface", In Proceedings of CHI'09 Extended Abrstracts on Human Factors in Computing Systems, Apr. 4, 2009, 6 Pages.
Villar, et al., "Mouse 2.0: Multi-touch Meets the Mouse", In Proceedings of the 22nd annual ACM symposium on User interface software and technology, Oct. 4, 2009, 9 Pages.

* cited by examiner

APPLICATION PROGRAMMING INTERFACE FOR MULTI-TOUCH INPUT DETECTION

PRIORITY

This application is a continuation-in-part of and claims priority to U.S. patent application Ser. No. 14/963,102 and to U.S. patent application Ser. No. 14/962,895, both filed on Dec. 8, 2015, which claim priority to U.S. Provisional Patent Application No. 62/190,727, filed on Jul. 9, 2015, which are incorporated herein by reference.

BACKGROUND

The popularity of smartphones, tablets, and many types of information appliances is driving demand and acceptance of touchscreens for portable and functional electronics. Touchscreens are found, among other places, in the medical field and in heavy industry, as well as for automated teller machines (ATMs), and kiosks such as museum displays or room automation, where keyboard and mouse systems do not allow a suitably intuitive, rapid, or accurate interaction by the user with the display's content.

Touchscreen displays continue to increase in size. Large touchscreen displays (e.g., greater than eighty inch diagonal) are being used as lecture tools in front of audiences, for example. Touchscreens allow a user to manipulate objects displayed by the touchscreen, such as object selection, positioning (e.g., dragging), and so on. Although touchscreens allow users to interact with displayed data, some existing systems have a number of drawbacks. For instance, when large touchscreens are used, some systems cannot properly interpret an input if multiple touch commands are received. Unlike a small screen, where a user may only utilize one hand or one finger, the interpretation of inputs from multiple or simultaneous touch commands on a large touchscreen may cause an error or inadvertent input.

SUMMARY

A sensing device, such as a user-wearable device (UWD) worn by a user of a touchscreen, may provide kinematic data of the sensing device or UWD and/or identification data of the user to a processor that operates the touchscreen. Such data may allow the processor to perform a number of user-touchscreen interactions, such as displaying user-specific windows or menus, processing user-manipulation of displayed objects, and determining which hand or fingers of a user performs a touch event, just to name a few examples.

Some configurations described herein are directed to interactive displays that may be operated by a touchscreen, particularly ones capable of distinguishing and responding to multiple simultaneous touches (multi-touch), and/or one or more digital styluses (pen and/or touch). While some configurations may be applied to larger interactive digital-whiteboard type displays, other configurations may be applied to smaller versions of interactive displays, such as those incorporated in so-called slate or tablet computers, for example, and even smaller devices such as touchscreen-operated smart phones.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
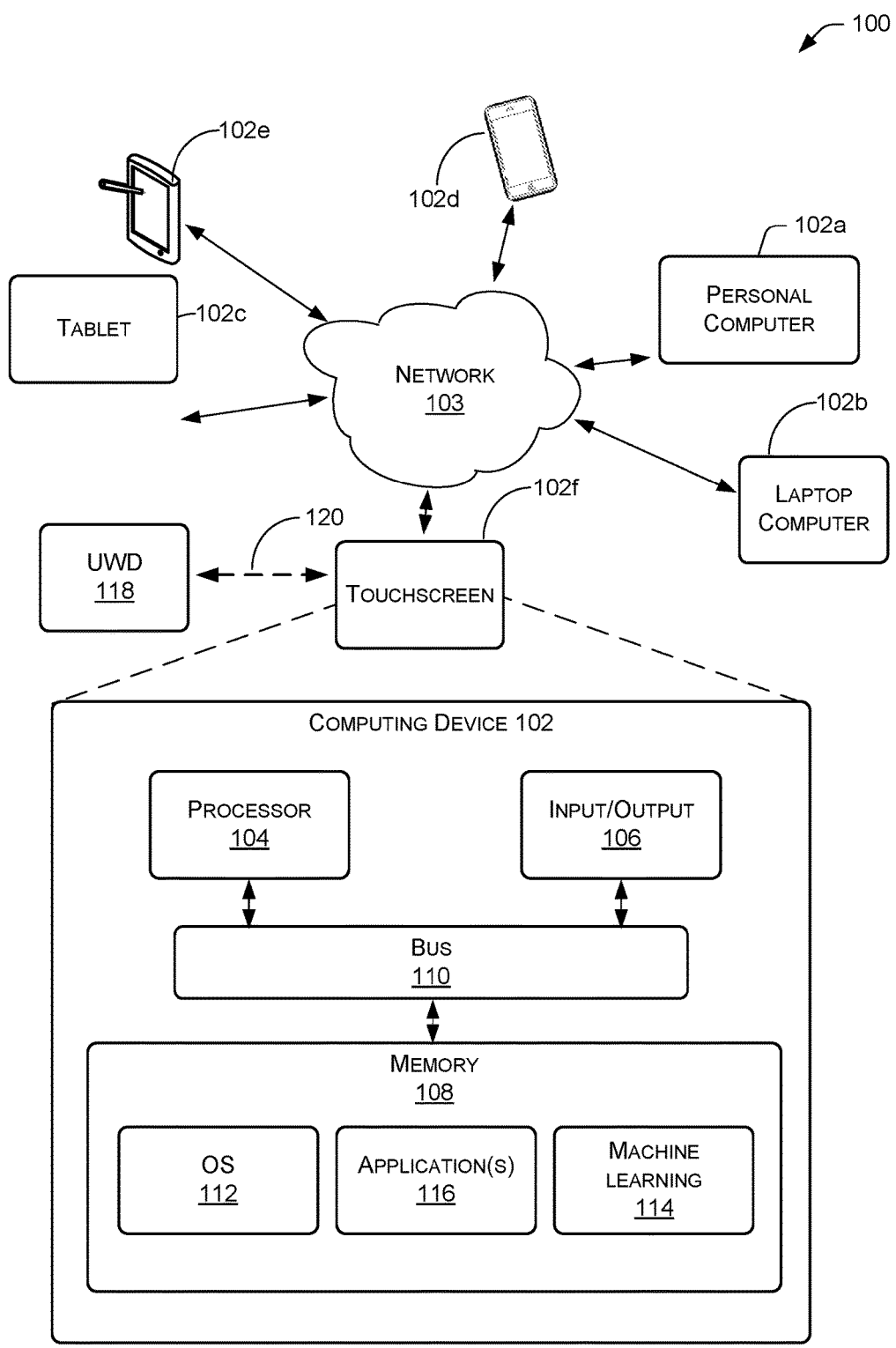
FIG. 1 is a block diagram depicting an example environment in which techniques described herein may be implemented.

When interacting with an object or device, each hand of a user (herein defined as a person having a right hand and a left hand or having one hand and an opposite hand) may have a different role. For example, the non-dominant hand may be specialized to position a workspace for the dominant hand. In some configurations, an apparatus may distinguish a dominant hand versus a non-dominant hand of a user by receiving wireless signals representative of motion of a device (e.g., a band or ring) worn by the user. The device, herein called a user-wearable device (UWD) may include, for example, motion sensors such as an accelerometer and/or gyro, or type of inertial measurement unit (IMU). Techniques involved may correlate motion of the UWD with touch event(s) of (and detected by) a touchscreen. In some implementations, such techniques may allow detection (or determination) of which user (and which hand or finger(s) of the user), among two or more users, is performing a touch event with the touchscreen (or "display surface", which may comprise any surface that may include a displayed image). In other implementations, techniques may correlate motion of a device (e.g., a controller, pen, etc.) held by a hand of a user (such as controller or a pen) with touch event(s) of (and detected by) a touchscreen. In other words, correlated motion need not involve a device worn by a user (e.g., a UWD). In still other implementations, techniques may correlate motion using remote sensing by tracking one or more of a user's hands (or fingers or portions of arms) by a camera, radar, a Doppler radar, acoustic sensing, Lidar, magnetic sensing, or depth camera, just to name a few examples.

Herein, various terms may be used for a touch display device, such as touch screen, touch display, and so on. Unless otherwise specified in a particular context, such terms are substantially equivalent. A touchscreen may include an input device normally layered on the top of an electronic visual display of an information processing system. A user may provide input or control the information processing system during a touch event using simple or multi-touch gestures by touching the display with a special stylus/pen, one or more fingers, one or more hands, or other body parts. The user may, for example, use the touch display to react to what is displayed and to control how it is displayed (for example by expanding (e.g., two-finger pinch zooming) text size, selecting menu items or objects, and so on). Herein, a touch event may involve physical touch between the user (e.g., the user's finger(s), hand(s)), or an object such as a stylus and the touchscreen, or may involve a hover event where the user (e.g., the user's finger(s), hand(s)), or an object such as a stylus comes relatively close to (e.g., a few millimeters or a few centimeters) the surface of the touchscreen without touching the touchscreen. In some examples, a touch event may refer to a pressing event that exceeds a certain pressure level (force) on a contact surface, such as that required by a resistive touchscreen. The term "touch event", unless otherwise indicated, refers to a touch event, a hover event, or a combination thereof). Herein, the term "arm/hand" is used to represent any portion of a user's arm or hand, from the shoulder to any of the fingers or thumb. For some examples, a touch event of an arm/hand may involve one or more fingers touching a touchscreen, a side of a hand touching, hovering or passing over a portion of the touchscreen, or a forearm in a particular orientation above the touchscreen. Claimed subject matter is not limited in this respect.

Rather than using a mouse, touchpad, or any other intermediate device, a touchscreen may enable a user to interact directly with displayed objects (e.g., windows, menus, text, drawings, icons, images, and so on) that are displayed. Though some examples herein recite a "screen," techniques herein may be similarly applied to a touch surface without an integrated display, or a display located separately from (or separately projected on) the input surface. For example, UWD sensing techniques may be used in combination with a grip sensor, as well as with a touchscreen (e.g., such as for sensing which hand and/or user makes contact with the rear surface of a grip sensing tablet). Thus, in some examples, a combination of a touch-sensitive surface plus a UWD need not involve a display.

Touchscreens may be used in devices such as game consoles, personal computers, tablet computers, smartphones, large display screens (e.g., situated at the front of a classroom or lecture hall), and so on. A touchscreen may be attached to a computer(s) or used a client device (e.g., as terminals) for networks. A touchscreen may be integrated in the design of digital appliances such as personal digital assistants (PDAs), GPS navigation devices, mobile phones, video games, E-books, and so on.

Various examples describe techniques and architectures for a system enabled to (among other things) detect dynamics of an arm/hand touching a touchscreen or non-touch-sensitive surface or display. For example, a system may detect or determine the impact (e.g., velocity and acceleration in three dimensions) of touch of an arm/hand onto a display or other surface.

In various examples, a system may allow portability of such techniques on any of a number of types of touchscreens, such as smartphones, slates, large displays, and so on for users wearing one or more UWDs that streams motion sensing data to receivers associated with the touchscreens.

In some configurations, a system may automatically detect, identify, or distinguish among a number of users operating (or being near) a touchscreen. This may be useful, for example, in cases where multiple people are working side by side and/or collaborating on a large touchscreen. In some implementations, cluster information may be used to detect actions of a user even if a hand of the user is not wearing a UWD. In some implementations, menus individually customized to particular users may follow the individual users across multiple devices. In some implementations, a finger clipboard may be used to carry files through the cloud, for example.

Herein, some configurations involve a UWD, which may be a wrist band, bracelet, a patch (e.g., adhesive patch), a glove (e.g., which need not cover the whole hand), and so on. In some cases, a UWD may be a watch or considered to be jewelry. Other examples of a UWD include a band (e.g., bracelet, clasp, bangles, etc.), ring (e.g., one or more on finger(s) or thumb(s)), armband or forearm sleeve or other electronic textiles (e.g., e-clothing), elbow pad or armband worn on upper arm, a mobile device (e.g., phone) affixed or strapped to an extremity, bandage, electronic tattoo with embedded sensors, electronic skin or graft, subcutaneous sensors (e.g., a relatively small module implantable or injected under the skin), electronic fingernail (e.g., stick-on-nail with display and/or sensing ability), sensors affixed as part of a piercing or other jewelry, or sensors held by the user, such as a controller, stylus, or pen, among other things. Regarding the latter example, though "UWD" refers to a device that is worn by a user, "UWD" may refer to a device that is held by a user.

In any case, a UWD may be configured to wirelessly transmit electronic signals representative of motion of the UWD (e.g., translation, rotation, orientation, speed, velocity, acceleration, etc.) and/or identification (ID) of the wearer of the UWD. Such ID may comprise identifying information for a particular user or for a group of users. For example, identification indicating a user is a faculty member and not a student may allow particular user-privileges or data access for faculty users not afforded to students. A UWD may include a memory device, a transmitter and/or transceiver, and/or a processor, for example, though claimed subject matter is not limited in this respect. In some implementations, a user may wear more than one UWD (e.g., a band on the non-dominant hand and a ring on the dominant hand).

In some examples, an ID may be in the form of a globally unique identifier (GUID) or MAC address or other unique string derived from the connection (pairing) of the UWD with the display or other proximal device. In some implementations, a username of a user and/or user information (e.g., user preferences) may be found on the Internet or Cloud (e.g., username not stored in the UWD) by using a GUID of the UWD. In some particular examples, detecting or establishing an ID need not require any additional hardware beyond sensors and a wireless connection.

In some configurations, when a finger of a user touches a touchscreen, a "touchdown" event (sometimes named "pointer-pressed") may be produced by an application programming interface (API). This event may be responsive to the finger having touched the touchscreen. In some configurations, the event may involve information that may allow a processor, for example, to determine which hand or finger(s) of the user, or which user among a number of users, has touched the touchscreen. For example, the information may include identification data of a user. The data may be stored in a UWD worn by the user. The data may be wirelessly communicated to a processor (e.g., a processor of the touchscreen) (i) subsequent to or in parallel with the touchdown event, (ii) from time to time or periodically, (iii) when the user (and the UWD) is within a particular distance from the touchscreen, or (iv) at the beginning of a session of use of the touchscreen, just to name a few examples.

The touchdown event may involve information that may allow a processor to determine the intensity of the touch. As described below, such determination may be based, at least in part, on motion detected using inertial measurement devices, such as an accelerometer, gyroscope, compass, and so on.

In some example configurations, actions of the processor, and associated actions of the touchscreen (e.g., what objects or images may be displayed subsequent to the event), may be based, at least in part, on the determination of (i) which hand of the user, or which user among a number of users, has touched the touchscreen, (ii) orientation of the hand at the time of touch, (iii) orientation of the other users' hands at the time of touch, and (iv) the intensity of the touch, among other things. For example, if a particular user is determined to have touched the touchscreen, then a menu that is customized (e.g., a priori, or based on most-recently-used commands and tools by the particular user, on the present device or elsewhere) to the particular user may be displayed. In another example, if a dominant hand of a user is determined to have touched the touchscreen, then the touchscreen may resultantly display objects or images different from the case where the non-dominant hand was determined to have touched the touchscreen. In yet another example, if the intensity (e.g., touch impact—how hard the user touched the screen) is determined (or detected) to be above a particular threshold, then the touchscreen may resultantly display objects or images different from the case where the intensity is determined (or detected) to be below the particular threshold. In yet another instance, there might be more than one threshold.

Herein, the phrase "modifying at least one object displayed by a touchscreen" refers to a touchscreen (e.g., or other type of display or surface) changing what (e.g., windows, menus, icons, graphical objects, text, and so on) or how (e.g., brightness and/or contrast of particular portions of the touchscreen) it displays the objects or display background. In some examples, a system may use indirect inputs (e.g., as in desktop computing, where a device on the desk triggers actions on the separate display). In other examples, a system may use interaction(s) on a projected surface. A surface need not be a display, per se, such as a case where an image is projected onto a surface such as a wall or desk.

A system, which may include a touchscreen, a processor of the touchscreen, and a UWD worn by a user, may wirelessly receive signals from the UWD. Signals representative of motion of the UWD (and thus associated motion of the user) may include shapes, profiles, spikes, etc. For example, signals representative of acceleration plotted as a function of time may include an acceleration pulse (e.g., spike or sharply-profiled pulse) that may indicate a touchdown event. This is because peak acceleration may occur at the time when the user's finger or hand touches a surface, such as the touchscreen. Accordingly, a pulse of an acceleration signal may indicate such a touchdown event. Such a pulse may have a pulse width (e.g., full width at half max (FWHM)) of about 100 milliseconds or less, though claimed subject matter is not so limited.

In some configurations, if the width of an acceleration pulse is below a (predetermined) threshold and its height (amplitude) is above a detection threshold, then the processor of the system may determine that there is a correlation between the touchdown event and the acceleration pulse produced by the UWD. Thus it may be likely that the hand wearing the UWD (the non-dominant hand may be wearing the UWD, but this need not be the case) just touched the touchscreen (or other surface). The processor of the system (e.g., via an API) may subsequently initiate a hand-detection event that will have information about which hand just touched (e.g., non-dominant hand in this case), user information (since the API "knows" which UWD motion produced the spike in the accelerometer at that time), and the intensity of the touch (e.g., light touch versus hard touch), which may be based on the shape of the spike (pulse). In some examples, an API may return a contact ID and finger position (which may be sensed by a standard touch API, for example). For illustrative purposes, an input provided by the non-dominant hand is referred to herein as a non-dominant input and an input provided by the dominant hand is referred to herein as a dominant input.

As just described, a UWD that is worn by a hand that performs a touch may produce an acceleration pulse or other motion rate change. The UWD worn on a hand that performs a touch may measure the acceleration profile when the touch occurs. (In some implementations, the UWD may stream transmitted sensor data while a processor controlling a display measures the acceleration profile or other motion parameters based, at least in part, on the sensor data.) On the other hand, the hand that is not wearing a UWD may instead perform a touch. Even though the hand not wearing the UWD performed the touch and the hand wearing the UWD did not perform a touch, the UWD may nevertheless produce an acceleration profile. This is because motion of one part of the user may transfer (e.g., "shock" wave, weight shift, etc.) to another part of the user. The difference is as follows: the UWD of a hand that performed a touch may produce a relatively spiked profile having a relatively large magnitude. But the UWD worn on the other hand (that did not perform the touch) may produce a relatively flattened pulse.

In some configurations, a user may wear multiple UWD's on the same arm (i.e. a ring and a band). For example, in such a case a system may be able to determine the orientation of the finger and the wrist to create more complex gestures. The motion signals provided by each device can also be combined in this case to more confidently or more sensitively detect spikes in the motion signal.

In some configurations, a UWD may be worn on the non-dominant hand, but the system may be automatically informed where the UWD is worn based, at least in part, on user preferences for a specific user. Such user preferences may be provided from memory located in the Cloud or part of a system, input by the user, or may be gathered directly from the UWD (e.g., user settings stored on the UWD). Default settings (e.g. users typically wear watches on the left hand) may also be used in case of incomplete knowledge. In another instance, machine learning, and/or cameras, etc. may be used to determine where the UWD is worn. In yet another instance, there may also be a mix of such approaches to determine where the UWD is worn. Configurations described herein may be applied to slates (e.g., not limited to large displays and smartphones) or any type of device (with or without a display) that can be touched.

In examples herein, though an element, such as a user, an object, finger, hand, UWD, processor, and so on, may be stated in the singular, claimed subject matter is not so limited. Thus for example, unless otherwise stated, more than one of such elements may be implied.

Various examples are described further with reference to FIGS. 1-18.

The environment described below constitutes one example and is not intended to limit the claims to any one particular operating environment. Other environments may be used without departing from the spirit and scope of the claimed subject matter.

FIG. 1 illustrates an example environment 100 in which example processes as described herein can operate. In some examples, the various devices and/or components of environment 100 include a variety of computing devices 102. By way of example and not limitation, computing devices 102 may include devices 102a-102f, which may be interconnected via a network 103 that may comprise the Internet or the Cloud, for example. Although illustrated as a diverse variety of device types, computing devices 102 can be other device types and are not limited to the illustrated device types. Computing devices 102 can comprise any type of device with one or multiple processors 104 operably connected to an input/output interface 106 and memory 108, e.g., via a bus 110. Computing devices 102 can include personal computers such as, for example, desktop computers 102a, laptop computers 102b, tablet computers 102c, telecommunication devices 102d, personal digital assistants (PDAs) 102e, a touchscreen(s) 102f, electronic book readers, wearable computers, automotive computers, gaming devices, measurement devices, etc. Computing devices 102 can also include business or retail oriented devices such as, for example, server computers, thin clients, terminals, and/or work stations. In some examples, computing devices 102 can include, for example, components for integration in a computing device, appliances, or other sorts of devices.

In some examples, some or all of the functionality described as being performed by computing devices 102 may be implemented by one or more remote peer computing devices, a remote server or servers, or a cloud computing resource. In some examples, a computing device 102 may comprise one or multiple processors 104 to receive kinematic and/or user identification from a UWD via input/output 106, which may comprise a wireless receiver, for example.

In some examples, as shown regarding touchscreen 102f, memory 108 can store instructions executable by the processor 104 including an operating system (OS) 112, a machine learning module 114, and programs or applications 116 that are loadable and executable by processor 104. The one or more processors 104 may include one or more central processing units (CPUs), graphics processing units (GPUs), video buffer processors, and so on. In some implementations, machine learning module 114 comprises executable code stored in memory 108 and is executable by processor 104 to collect information, locally or remotely by computing device 102, via input/output 106. The information may be associated with one or more of applications 116. Machine learning module 114 may selectively apply any of a number of machine learning decision models stored in memory 108 (or, more particularly, stored in machine learning 114) to apply to input data. For example, machine learning may be involved in processes involving the processor interpreting or determining user actions based, at least in part, on information received from a UWD 118, which may wirelessly communicate with a device (e.g., 102) that operates touchscreen 102f via wireless communication path 120. In some implementations, touchscreen 102f may comprise a display surface (e.g., any surface such as a wall, table, etc.) associated with processor 104. For example, touchscreen 102f may be a wall with an image displayed thereon by a projector operated by a processor.

Though certain modules have been described as performing various operations, the modules are merely examples and the same or similar functionality may be performed by a greater or lesser number of modules. Moreover, the functions performed by the modules depicted need not necessarily to be performed locally by a single device. Rather, some operations could be performed by a remote device (e.g., peer, server, cloud, etc.).

Alternatively, or in addition, some or all of the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In some examples, computing device 102 can be associated with a depth camera, which may be used to measure distances from the camera to various portions of an image captured by the camera. In some cases, individual pixels of the image may have associated distance data specifying the distance from the camera to the portion of the image corresponding to the respective pixel. In some examples, computing device 102 can be associated with a camera capable of capturing images and/or video and/or a microphone capable of capturing audio. For example, input/output module 106 can incorporate such a camera and/or microphone. Captured images of users of a touchscreen, for example, may be compared to images in a database of users stored in memory 108, and such comparing may be used, in part, to identify the users. Audio of speech may be compared to audio in a database of users stored in memory 108, and such comparing may be used, in part, to identify the users. Such identifying may be used in conjunction with identify information provided by UWD worn by one or more of the users. Memory 108 may include one or a combination of computer readable media.

Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media embodies computer readable instructions, data structures, program modules, or other data in a modulated data signal, such as a carrier wave, and/or other transmission mechanism. As defined herein, computer storage media does not include communication media. In various examples, memory 108 is an example of computer storage media storing computer-executable instructions. When executed by processor 104, the computer-executable instructions configure the processor to, among other things, receive kinematic data for a UWD during a touch event for a touchscreen performed by a user; and modify at least one object displayed by the touchscreen based, at least in part, on the received kinematic data.

In various examples, an input device of input/output (I/O) interfaces 106 can be an indirect input device (e.g., a mouse, keyboard, a camera or camera array, etc.), or another type of non-tactile device, such as an audio input device.

Computing device(s) 102 may also include one or more input/output (I/O) interfaces 106 to allow the computing device 102 to communicate with other devices. Input/output (I/O) interfaces 106 can include one or more network interfaces to enable communications between computing device 102 and other networked devices such as other device(s) 102. Input/output (I/O) interfaces 106 can allow a device 102 to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like).

Figure 2:
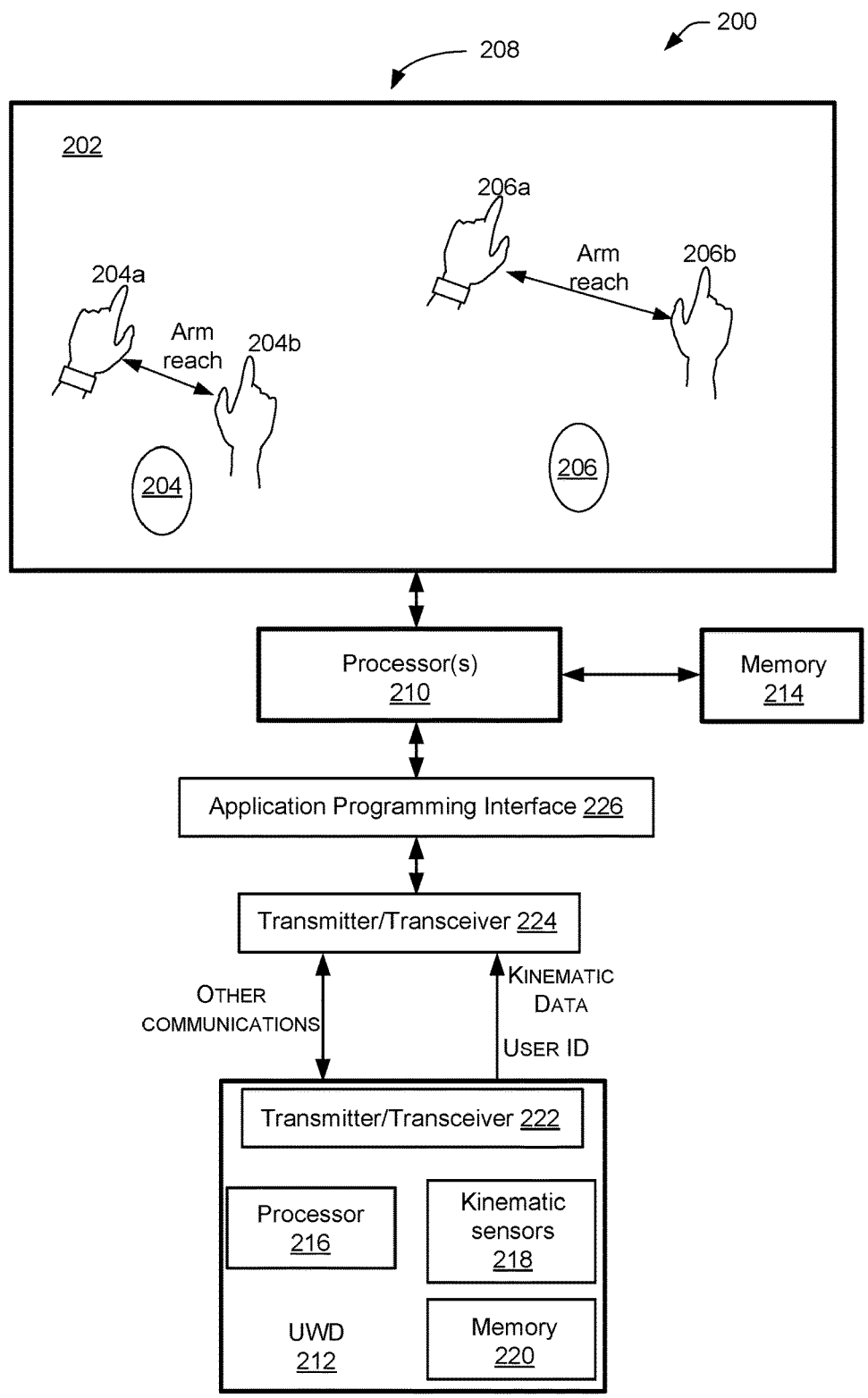
FIG. 2 is a schematic representation of an example system that includes a touchscreen and users of the touchscreen, according to example configurations.

FIG. 2 is a schematic representation of a system 200 that includes a touchscreen 202 and users 204 and 206 of the touchscreen, according to example configurations. User 204 has a dominant hand 204a and a non-dominant hand 204b. User 206 has a dominant hand 206a and a non-dominant hand 206b. (It is to be noted that a user may wear a UWD on a non-dominant hand or dominant hand). Such hand assignments are merely examples, and a dominant or non-dominant hand may be a left hand or a right hand of a user. Though a finger of the hands is illustrated as approaching and/or touching the touchscreen, examples include cases where more than one finger, a side or back of a hand, or the thumb may approach or touch a touchscreen, and claimed subject matter is not limited in this respect. Also, right and left hands of a user may cross one another in their approach or touch of a touchscreen. Moreover, right and left hands of multiple users may cross one another in their approach or touch of a touchscreen.

System 200 may further comprise a processor 210 associated with touchscreen 202 and a UWD 212. In various configurations, a "system" may be considered to include any combination of things identified as being in system 200, which is a particular example for which claimed subject matter is not so limited. For example, in some configurations, a system may be considered to be touchscreen 202 and processor 210 (e.g., excluding the users and UWD). Again, claimed subject matter is not so limited.

In some examples, functionality described as being a part of UWD 212 may instead (or additionally) be part of a device that is not worn by a user, such as a device held by a hand of the user. In a particular example, a pen or controller, which may be held by a hand, may incorporate such functionality.

Herein, unless specifically noted, "processor" may include one or more processors. Processor 210, which may be similar to or the same as processor 104 of computing device 102, illustrated in FIG. 1, may be used to operate touchscreen 202. For example, processor 210 may execute code to allow touchscreen 202 to display objects generated by any of a number of applications, which may also be executed by processor 210. A memory 214, which may be local (e.g., hard-wired in packaging of touchscreen 202 and/or processor 210) or remote (e.g., in a wired or wireless computer network), accessible to processor 210 may store such executable code or applications.

UWD 212 may be communicatively coupled (e.g., wired or wirelessly) to processor 210 (and thus to touchscreen 202). UWD 212 may include a processor 216, kinematic sensors 218, a memory 220, and a transmitter/transceiver 222. In some examples, UWD 212 may further include a heartbeat monitor, light sensors, cameras, depth cameras, and so on. Kinematic sensors 218, which may comprise inertial sensors, gravitational sensors, compasses, accelerometers, barometric sensors, force sensors or strain gauges, bend or flex sensors, sensors that detect compression of a material, and so on, may generate kinematic data that includes position, velocity, and/or acceleration of the UWD with respect to an inertial coordinate system (e.g., in reference to touchscreen 202) and/or with respect to the local coordinate system of the wearable itself. UWD 212 may transmit kinematic data via transmitter/transceiver 222 to processor 210 via a transmitter/transceiver 224. Information received via transmitter/transceiver 224 may be provided to an API 226, which in turn may be operated, at least in part, by processor(s) 210.

Memory 220 may store personal and/or identifying data of individual users. Such data, for example, may include user preferences for operating various applications (e.g., menu or display parameters), identification (e.g., ID number, name, user name, and so on) to allow for distinguishing the user from other users, and historical data of kinematic behavior (e.g., physical characteristics of touch events that are typical for the user). In some configurations, the GUID of the UWD may be transmitted while the rest of the data comes from the Cloud or from system 202, or a combination thereof. In some configurations, a user of UWD 212 or system 200 has to "opt-in" or take other affirmative action before personal data may be used or stored by the UWD or system 202, or another system in communication with UWD or system, or the cloud.

In some configurations, processor 210 may transmit information (e.g., "other communications", as identified in FIG. 2) to UWD 212, such as handshaking data or signals that notify presence or various actions performed by processor 210 and/or UWD 212.

As pointed out above, a touch event may be, among other things, one or more hands or one or more fingers physically contacting a touchscreen. By any of a number of techniques described herein, system 200 may be able to identify particular users 204 and 206, and these users may have different attributes, such as different heights, different arm-length reaches, and so on. Such attributes may be stored by in memory 214, 220, or the Cloud (e.g., 103). For example, user 206 may be taller than user 204 and may be able to reach higher on touchscreen 202 toward the top 208 of the touchscreen, as compared to user 204. User 206 may also have a wider reach so that, for a given standing or sitting position in front of touchscreen 202, hands 206a and 206b may be able to cover a wider portion of touchscreen 202 as compared to user 204.

In some configurations, subsequent to determining which hand of a user is dominant and non-dominant, system 200 may modify any of a number of features or objects displayed by touchscreen 202. Such features or objects may include, among other things, windows, menus, icons, brightness and/or contrast of particular portions of the touchscreen, graphical objects, text, and so on. For example, because hand 204a is the dominant hand of user 204, a region of touchscreen 202 around the location of user 204 or around a touch event initiated by hand 204a may display objects appropriate for action by a dominant hand, which may be different from those for a non-dominant hand.

In some configurations, subsequent to determining which hand of a user is left and right (e.g., independent of which hand is dominant and non-dominant), system 200 may modify any of a number of features or objects displayed by touchscreen 202 based on such determination. For example, the portion of the touchscreen that is determined to be relatively near (or within arm's reach, for example, based on size information about the user, handedness of the user, and so on) the left hand may display differently as compared to the portion of the touchscreen relatively near the right hand.

In some configurations, using motion information provided by UWD 212 worn by user 204 or 206 (or any possible additional users), the user may initiate a touch event involving two or more fingers, hands, or any combination thereof to virtually "grab" an object displayed by touchscreen 202 and rotate and/or translate the displayed object in real time as the user's hands or fingers (or wrist, etc.) correspondingly rotate and/or translate. For example, such three-dimensional ("3D") manipulation of displayed objects may then be dragged and dropped to various parts of the display of the touchscreen.

In some configuration, 2D orientation information provided by UWD 212 worn by user 204 or 206 (or any possible additional users) may be used in an example case where fingers/hand may behave as if touching a (virtual) knob on the touchscreen and turning the knob by rotating the fingers/hand to the left or right.

In some configuration, orientation information provided by UWD 212 worn by user 204 or 206 (or any possible additional users) may be used to control displayed information. If the user reaches to a relatively higher point (e.g., resulting from a steeper tilt of the UWD), a particular menu may be displayed. If the user touches a relatively lower point, a different menu may be displayed. UWD orientations may enable a display of multiple menus or different information, according to the location of the touch relative to the user position.

In some configuration, orientation information provided by UWD 212 worn by user 204 and/or 206 (or any possible additional users) may be used to modify touch events. In a similar fashion to retrieving new or deeper information by additional pressure, a user may orient a hand relative to a touch point (such as changing the tilt of the hand, or the horizontal direction of the hand) as a gesture to receive additional data related to the touched object, for example.

In some configurations, using kinematic information provided by UWD 212 worn by a user, the user may magnify (enlarge) displayed objects. In some cases, a user may magnify an object while performing 3D manipulation of that object and/or other objects (e.g., gesture in the air). For example, user 204 may initiate a touch event comprising physical contact with touchscreen 202 or comprising a hover over the touchscreen. The touch event may include the user performing a pinching or spreading motion of their hands and/or fingers in space or on the surface of the touchscreen. Such motion may correspond to negative or positive magnification of objects displayed by touch screen 202.

In some examples, a touch event may comprise a hand of the user hovering above a touchscreen. In such a case, a processor may track motion of the hovering hand of the user and modify at least one object displayed by the touchscreen based, at least in part, on the motion of the hovering hand of the user. For example, the motion of the hovering hand may comprise rotation of the hovering hand. Modifying object(s) displayed by the touchscreen may involve rotating the object(s) corresponding to the rotation of the hovering hand.

In some configurations, by using kinetic data provided by UWD 212 worn by a user, system 200 need not include a camera, depth camera, or other image/video-capturing device to detect or measure motion of one or more of the users. Such configurations may also allow system 200 to detect, using UWD 212, a user approaching and leaving (e.g., walking toward or away from) touchscreen 202.

In some configurations, UWD 212 may provide personal information about each user (e.g., after an "opt-in" selection by each user), or may provide identification of each user so that processor 210 may subsequently retrieve from memory 214 such personal information.

In some configurations, UWD 212 may allow personal information or user-preference settings to transfer across multiple devices (e.g., devices other than touchscreen 202 and processor 210). For example, if a user has a particular work-in-progress activity displayed on touchscreen 202, then the user may transfer (e.g., leave touchscreen 202 and walk) over to another computing device or display and the work-in-progress activity may likewise transfer to the other computing device or display (e.g., the work-in-progress activity may be displayed by the other device). Icons, personal menus, display settings, and so on, may similarly be transferred across multiple devices. Memory 220 of the UWD may store data that enables such transfer. In another configuration, the UWD may act as an identifier of the user for the different devices so that the different devices may retrieve (e.g., from another device on a network, a server, Internet, or Cloud) icons, personal menus, settings, work-in-progress, and so on.

Figure 3:
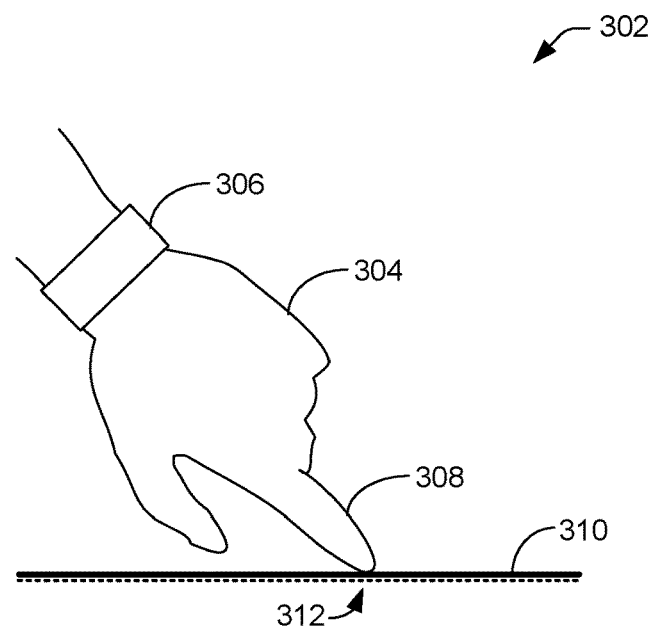
FIG. 3 includes timing diagrams of an example touch event performed by an arm/hand wearing a user-wearable device.
Figure 3:
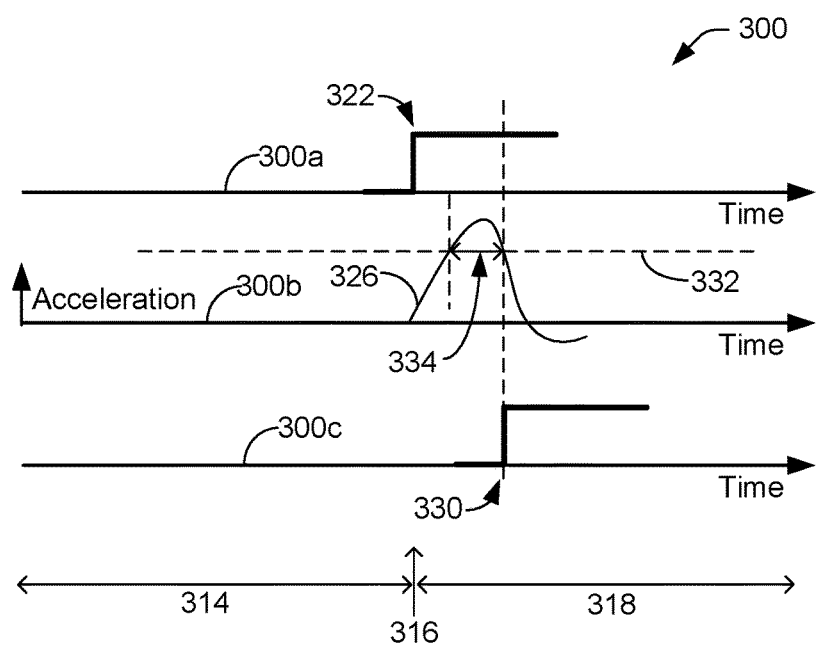

FIG. 3 includes timing diagrams 300 (300a, 300b, 300c) of an example touch event 302 performed by an arm/hand 304 wearing a UWD 306. In this example, touch event 302 comprises a physical contact between a finger 308 and a display surface 310 of a touchscreen 312. In other examples, instead of finger 308, any portion of arm/hand 304, such as more than one finger or a side or back of the hand, may initiate such a touch event by physical contact with display surface 310.

In detail, touch event 302 involves a time 314 before contact between finger 308 and surface 310, the time 316 at contact, and the time 318 subsequent to the contact. Timing diagram 300a depicts timing of touch event 302 represented by a step 322. For example, a processor (e.g., processor 104 or 210) may operate an application programming interface (API), associated with touchscreen 312, that detects the moment that finger 308 touches surface 310. Timing diagram 300*b* depicts relative acceleration (hereinafter, the word "relative" need not be explicit and may be implied) of the UWD 306 during touch event 302 and is represented by curve 326. Timing diagram 300*c* depicts timing of a threshold event, explained below, represented by a step 330.

Before contact, finger 308 (or any portion of an arm/hand) approaches surface 310 with a particular speed or velocity (e.g., speed is a scalar quantity that is independent of direction whereas velocity is a vector quantity that includes magnitude and direction in each of three orthogonal directions) and impinges onto surface 310. UWD 306 generally follows the motion of finger 308. For example, the speed of UWD 306 and finger 308 may be similar or the same, and the path of UWD 306 and finger 308 may be the same but offset by a fixed amount (e.g., a distance between fingertip and the UWD). At the time of contact with surface 310, finger 308 decelerates. In other words, the surface stops the motion of the finger. Hereinafter, deceleration, being a negative acceleration, is referred to as merely "acceleration," unless otherwise described. The motion of UWD 306 corresponds to the motion of finger 308, and thus UWD 306 experiences similar acceleration. In a microscopic time scale, the acceleration increases to a peak value and then decreases, following a profile of a curve, such as curve 326, which is the acceleration profile of UWD 306, and may be described as a pulse. Subsequent to the impact of the finger onto the surface, a small recoil (e.g., bounce) may occur, giving rise to a reverse acceleration, which is illustrated by the portion of curve 326 that is below the time axis. UWD 306, whether worn on an upper arm, wrist, or finger (or other portion of the user), may experience an acceleration profile such as 326.

In some implementations, a UWD may be able to detect the presence of a touch surface, either by a proximity signal or possibly through capacitive coupling (for example). Such detection may subsequently wake up a sensing module to collect a burst of high-bandwidth sensor data. In other implementations, a UWD may be able to initiate high frequency sampling when detection of a relatively large (e.g., "hard") acceleration interrupts the processor of the UWD. Such implementations may be useful for power savings of small battery operated devices, for example.

In some cases, finger 308 (or any portion of an arm/hand) may approach surface 310 with a particular acceleration (e.g., a scalar or vector quantity). In examples described herein, however, such an "initial" acceleration may be negligible or ignored in a particular inertial reference frame, so that any initial acceleration is assumed to be zero.

Curve 326 may be described as a pulse having a particular shape that is based, at least in part, on the speed and direction of finger 308 as it approaches and impinges on surface 310. Pulse shape may also depend, among other things, on what portion of a user's arm/hand impinges on the surface, whether a dominant or non-dominant hand performs the touch, where on the user the UWD is worn, a light touch versus a hard touch, extension (e.g., elbow bend) of the user's arm, the size of the user and other physical characteristic of the user, and habits or tendencies that may be particular to a specific user, as described below. For example, the speed and direction of a finger on a dominant hand may be different from that of a finger on a non-dominant hand, and such a difference may lead to different pulse shapes. In some examples, information about where on the user the UWD is worn may be stored in the UWD and/or Cloud and/or may be dynamically learned based on the user's behavior (e.g., via machine learning), and so on.

In some examples, a technique for determining whether a dominant hand or a non-dominant hand of a user produced a touch event involves establishing a detection threshold (DT), which may be based on experimental and/or statistical data, for instance. A DT is a particular value of acceleration that, when exceeded by a portion of an acceleration pulse of a touch event, indicates some condition that is different from the case where the DT is not exceeded by an acceleration pulse. For example, FIG. 3 illustrates a DT 332 that is surpassed by a peak portion of curve 326. This may indicate that UWD 306 is worn on the same arm/hand as that of finger 308, which performed touch event 302. If curve 326 had a relatively small peak magnitude, as detailed below in FIG. 5, the DT 332 would not be surpassed and it may be determined that the UWD is worn on a part of the user other than the same arm/hand as that of finger 308.

In some examples, a processor may determine that curve 326 produces a touch event subsequent to when curve 326 rises above DT 332. In particular, when curve 326 subsequently falls below DT 332, the processor determines that touch event 302 has occurred, as represented by a step 330. In some implementations, the processor may consider a time limit measured from when touch event 302 occurs, e.g., step 322. If, for example, an acceleration pulse (e.g., represented by curve 326) fails to exceed DT 332 within such a time limit, then the processor may determine that the acceleration pulse was initiated by an arm/hand opposite to that which is wearing the UWD. In some examples, such a failure of an acceleration pulse to exceed DT 332 within such a time limit may be indicative of a case where the acceleration pulse is negligible and is merely noise and is not caused by a touch event.

The shape of an acceleration pulse may indicate a number of things, described below. For example, an acceleration pulse may include a particular shape or feature(s) that allows system 200 to determine that a particular user produced the acceleration pulse. In other words, a particular user may produce a distinct and identifiable acceleration pulse caused by particular movement habits or tendencies. The shape of an acceleration pulse may be characterized by, among other things, slope at various parts of the pulse, peak magnitude, full-width-at-half-max (FWHM), and pulse a width 334 at a DT, such as 332. Claimed subject matter is not limited to such examples, of course, and any of a number of other approaches may be used to detect pulses, including approaches involving machine learning.

Figure 4:
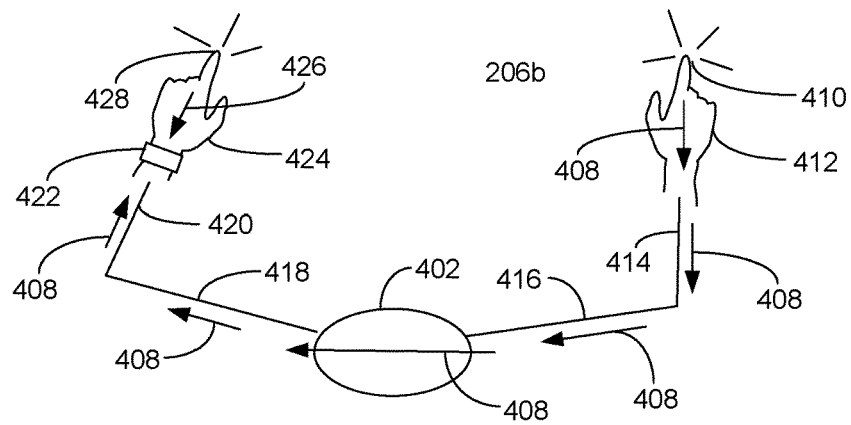
FIG. 4 schematically illustrates example acceleration pulses travelling from one hand of a user to the other hand.

FIG. 4 schematically illustrates example acceleration pulses travelling from one hand of a user 402 to the other hand. Generally, as it travels through a user, the intensity or strength of an acceleration pulse diminishes. Mass of the user and travel distance attenuates the acceleration pulse. A system (e.g., system 200) may measure the strength of an acceleration pulse, among other things as described below, to determine which arm/hand of a user produced a touch event. (In some implementations, in the case where a hand that is not wearing a UWD touches a surface, a relatively small acceleration spike detected by a UWD on the other hand may contribute to identifying which user just touched the display.)

A portion of an arm/hand (e.g., fingertip) impinging on a surface such as a touchscreen may generate an acceleration pulse originating at the impinging portion of the arm/hand. For example, such an acceleration pulse 408 may be generated at fingertip 410 of hand 412. Though attenuated, acceleration pulse 408 may travel to any other portion of user 402. In the example illustrated, acceleration pulse 408 travels through hand 412, through forearm 414, through upper arm 416, through the shoulders and torso of user 402, through upper arm 418, and through forearm 420. A UWD 422 may measure acceleration pulse 408 which, as mentioned, will be attenuated as compared to the magnitude of acceleration pulse 408 closer to its origin (e.g., fingertip 410). Because of such attenuation, measurement by a UWD of an acceleration pulse originating at a portion of an arm/hand 424 that is wearing the UWD may be stronger (e.g., higher peak magnitude) as compared to an acceleration pulse originating at a portion of the other arm/hand, which is not wearing the UWD. For example, an acceleration pulse 426 generated by touch of fingertip 428 on a touchscreen may be stronger at UWD 422 as compared to acceleration pulse 408, even though acceleration pulses 408 and 424 may initially be the same or similar in strength.

In some examples, direction of an acceleration pulse may provide an indication about orientation of the arm/hand (e.g., and thereby the user) during touch. For instance, touching with the back of the hand (such as when giving a presentation and the user is not away from the touchscreen) may generate an acceleration spike in the opposite direction from that of a "normal" touch (where the user is typically facing the touchscreen) and may thus be distinguished from such a normal touch.

Figure 5:
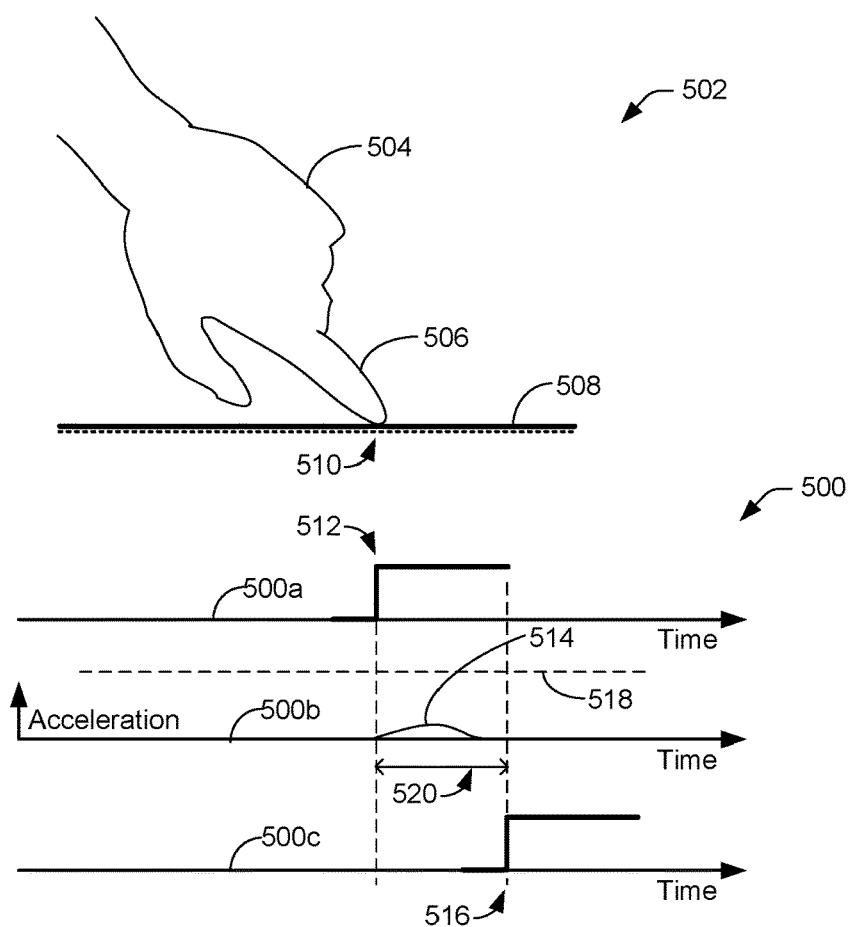
FIG. 5 includes timing diagrams of an example touch event performed by an arm/hand opposite the arm/hand wearing a user-wearable device.

FIG. 5 includes timing diagrams 500 (500a. 500b, 500c) of an example touch event 502 performed by an arm/hand 504 that is not wearing a UWD. In this example, touch event 502 comprises a physical contact between a finger 506 and a display surface 508 of a touchscreen 510. In other examples, instead of finger 506, any portion of arm/hand 504, such as more than one finger or a side or back of the hand, may initiate such a touch event by physical contact with display surface 508.

The situation illustrated in FIG. 5 is similar to that of FIG. 3 except that arm/hand 504, which initiated touch event 502, is not wearing a UWD. In the case for FIG. 3, arm/hand 304, which initiated touch event 302, is wearing a UWD. Thus, in the case for FIG. 5, a UWD is worn on the arm/hand opposite to that which initiated the touch event.

Timing diagram 500a depicts timing of touch event 502 represented by a step 512. For example, a processor (e.g., processor 104 or 210) may operate an application programming interface (API), comprising touchscreen 510, that detects the moment that finger 506 touches surface 508. Timing diagram 500b depicts relative acceleration of the UWD, which is worn on the arm/hand opposite that of finger 506, during touch event 502 and represented by curve 514. Timing diagram 500c depicts timing of a timeout event, explained below, represented by a step 516.

An acceleration pulse, such as 408, may be generated by touch event 502 and measured by the UWD, which is worn on the opposite arm/hand. Thus, the acceleration pulse must travel through the user by a greater distance (occupied by body mass, skeletal joints, etc.) as compared to the case where the UWD is worn on the same arm/hand that initiated the touch event. Accordingly, the acceleration pulse is attenuated by a greater amount and the UWD measures a relatively small acceleration pulse. This may be observed by comparing curves 326 and 514.

Like curve 326, curve 514 may be described as a pulse having a particular shape that is based, at least in part, on the speed and direction of finger 506 as it approaches and impinges on surface 508. Pulse shape may also depend, among other things, on what portion of a user's arm/hand impinges on the surface, whether a dominant or non-dominant hand performs the touch, where on the user the UWD is worn, extension (e.g., elbow bend) of the user's arm, body size and shape, and habits or tendencies that may be particular to a specific user, as described below. For example, the speed and direction of a finger on a dominant hand may be different from that of a finger on a non-dominant hand, and such a difference may lead to different pulse shapes.

In some examples, a technique for determining whether a dominant hand or a non-dominant hand of a user produced a touch event involves establishing a DT, which, as explained above, is a particular value of acceleration that, when exceeded by a portion of an acceleration pulse of a touch event, indicates some condition that is different from the case where the DT is not exceeded by an acceleration pulse. For example, FIG. 5 illustrates a DT 518 that is not surpassed by any portion of curve 514. This may indicate that the UWD is worn on the opposite arm/hand as that of finger 506, which performed touch event 502. On the other hand, if curve 514 had a relatively large peak magnitude, as detailed below in FIG. 3, DT 518 may be surpassed and it may be determined that the UWD is worn on a part of the user that is the same arm/hand as that of finger 508.

In some examples, the processor may consider a time limit 520 measured from when touch event 502 occurs, e.g., step 512. If, for example, an acceleration pulse (e.g., represented by curve 514) fails to exceed DT 518 within such a time limit, then the processor may determine that the acceleration pulse was initiated by an arm/hand opposite to that which is wearing the UWD, which is the case in FIG. 5. At the end of time limit 520, the processor makes such a determination.

In some examples, such a failure of an acceleration pulse to exceed DT 518 within such a time limit may be indicative of a case where the acceleration pulse is negligible and is merely noise and is not caused by a touch event.

Figure 6:
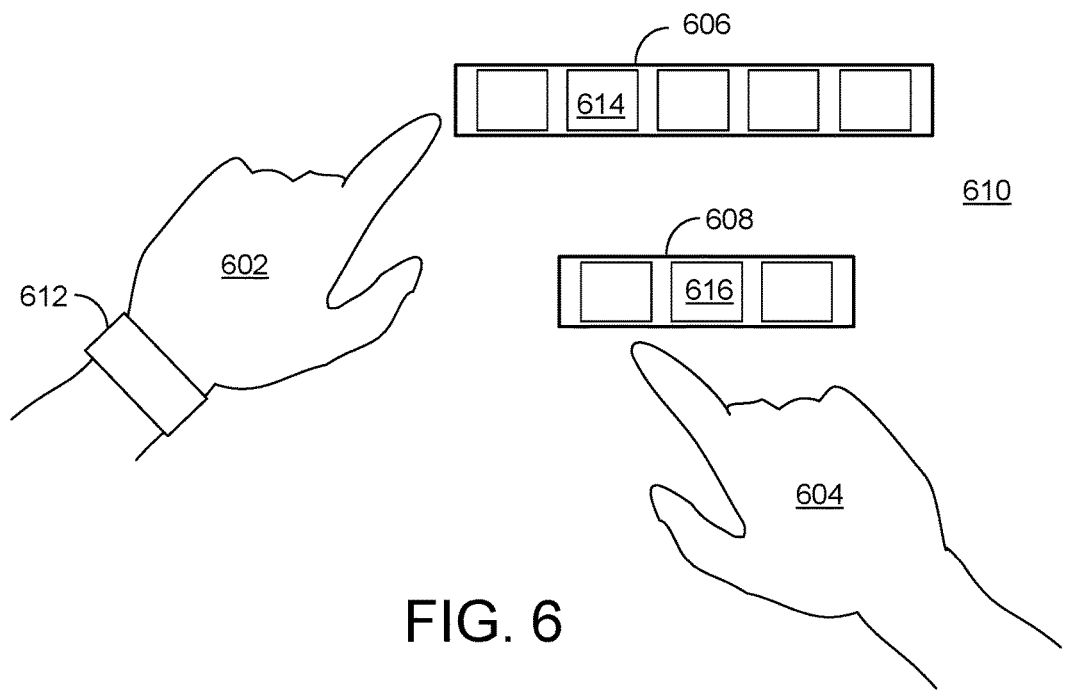
FIG. 6 illustrates arms/hands interacting with example objects displayed on a touchscreen.

FIG. 6 illustrates arms/hands 602 and 604 of a user interacting with example objects 606 and 608 displayed on a touchscreen 610. In some examples, a UWD may be worn on a dominant arm/hand, and in other examples, a UWD may be worn on a non-dominant arm/hand. In the example illustrated in FIG. 6, arm/hand 602 is considered to be the dominant arm/hand and is wearing a UWD 612. Arm/hand 604 is considered to be the non-dominant arm/hand and is not wearing a UWD.

Objects 606 and 608 may comprise any of a number of displayable things, such as windows, menus, text, drawings, icons, images, and so on. For example, if object 606 is a menu, then object 614 may be one of a number of menu items that may be selected by the user touching object 614. In some examples, object 608 may comprise text that includes a number of words 616, which may be selected by the user touching any of the words.

As discussed above, when interacting with an object or device, each hand of the user may have a different role. For example, non-dominant hand 604 may be specialized to position object 608 for dominant hand 602. In some configurations, a system may automatically distinguish a dominant hand versus a non-dominant hand of a user by receiving wireless signals transmitted from UWD 612 to the system and which are representative of motion of the UWD. Motion of the UWD may correspond to motion of hand 602 and 604 (though the motion correspondence between hand 602 and UWD 612 may be closer than that between hand 604 and UWD 612).

Figure 7:
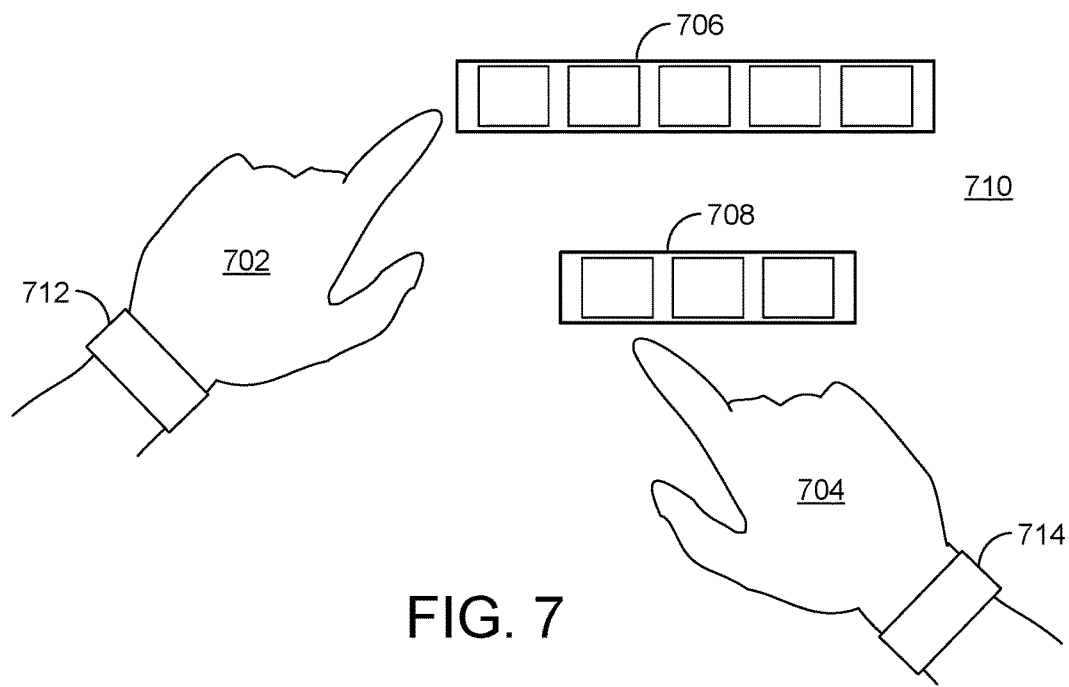
FIG. 7 illustrates arms/hands of two users interacting with example objects displayed on a touchscreen.

FIG. 7 illustrates arms/hands 702 and 704 of two different users interacting with example objects 706 and 708 displayed on a touchscreen 710. In some examples, a UWD 712 may be worn on a (dominant or non-dominant) arm/hand of a first user, and a UWD 714 may be worn on a (dominant or non-dominant) arm/hand of a second user. Objects 706 and 708 may comprise any of a number of displayable things, such as windows, menus, text, drawings, icons, images, and so on.

In some implementations, a system may determine which user, among the two users, is performing a touch event with the touchscreen. For example, UWDs 712 and 714 may provide identification data for their respective wearers to the system. The system may correlate touch events (e.g., timing thereof) with motion of the UWDs and the identification data they provide. For example, UWD 712 may provide such identification data to the system periodically, from time to time, in response to a request from the system, or at the time of a touch event. If the system senses of a touch event (e.g., via electronics of the touchscreen), the system may correlate this touch event with motion of UWD 712 and motion of UWD 714 to determine which user initiated the touch event. The correlation between the touch event and the motion of the UWD worn on the arm/hand that initiated the touch event will be stronger than the correlation between the touch event and the motion of the UWD worn on the arm/hand that did not initiated the touch event. Accordingly, the system may determine which user initiated the touch event. Though this example involved two users, such an approach may be performed by a system for any number of users interacting with a touchscreen, for example.

Figures 8, 9:
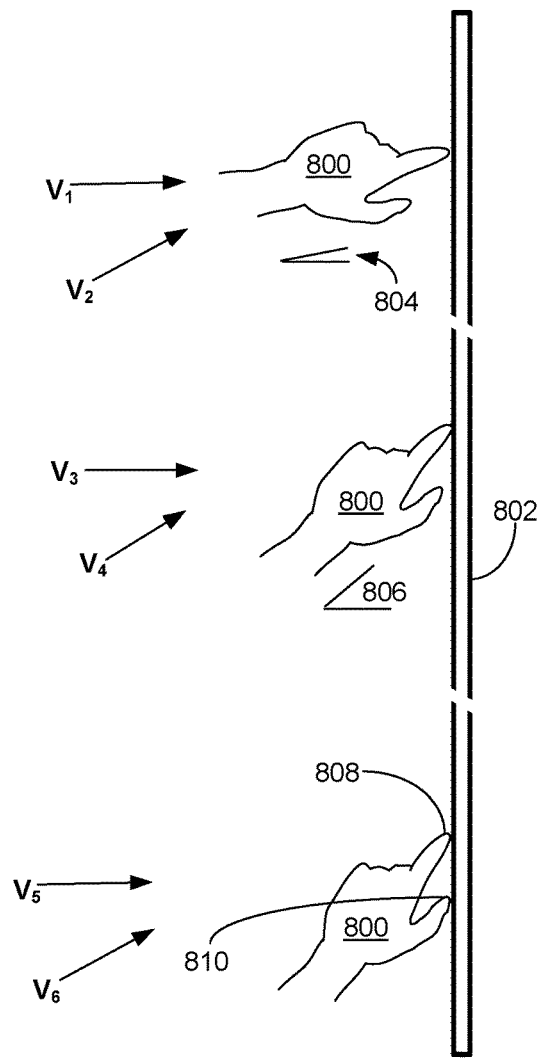
FIG. 8 illustrates various angles of approach of arms/hands onto a touchscreen, according to some examples.
FIG. 9 is an example data table that includes user identification for a number of individual users and historical data corresponding to the individual users.

FIG. 8 illustrates various angles of approach of an arm/hand 800 of a user onto a touchscreen 802, according to some examples. Arm/hand 800 is illustrated for a number of combinations of approach velocity and hand rotation. As mentioned above, an acceleration pulse of a touch event initiated by an arm/hand may depend, at least in part, on kinematics of the arm/hand as it approaches a touchscreen. For example, hand 800 approaching touchscreen 802 at the substantially orthogonal angle of velocity vectors $V_1$, $V_3$, or $V_5$ may produce an acceleration pulse having a larger magnitude as compared with an acceleration pulse produced by hand 800 approaching the touchscreen at a skewed angle of $V_2$, $V_4$, or $V_6$. Rotation of arm/hand 800 may also affect the acceleration pulse of a touch event. For example, arm/hand 800 having a relative rotation 804 may produce an acceleration pulse having characteristics different from an acceleration pulse produced by hand 800 having a relative rotation 806 (all other kinematics being equal). Such characteristics of the acceleration pulse may include pulse width, magnitude, and shape (e.g., slope at various portions of the pulse).

In another example, arm/hand 800 initiating a touch event with one portion (e.g., finger 808) of the arm/hand may produce an acceleration pulse having characteristics different from an acceleration pulse produced by hand 800 initiating a touch event with two or more portions (e.g., finger 808 and thumb 810) of the arm/hand (all other kinematics being equal). Such characteristics of the acceleration pulse may include pulse width, magnitude, and shape (e.g., slope at various portions of the pulse). Such a touch event may be initiated if the two or more portions touch touchscreen 802 at the same time or within a predetermined time span (e.g., a few hundred milliseconds, or other time span appropriate for a particular application).

In some examples, individual users may demonstrate particular arm/hand rotation and kinematics of approach for a touch event. In other words, a user may have tendencies or habits that are particular for that user, and such tendencies or habits may be distinguishable from other users. Accordingly, a system may use arm/hand rotation and kinematics of approach for a touch event on a touchscreen initiated by a user to help identify the user. During such a process of identification, the system may also use other information, such as position and/or sequence of touch events by the user and other users, identification data provided by UWDs worn by the user and the other users, and so on.

In some examples, ID data provided by a UWD worn by a user may include height of the user. A system may modify at least one object displayed by a touchscreen based, at least in part, on the height of the user. For example, is the user is relatively short, the system may tend to display objects (e.g., windows and menus) on lower portions of the touchscreen.

FIG. 9 is an example data table 900 that includes user identification for a number of individual users and historical data corresponding to the individual users. As mentioned above, a user may have tendencies or habits that are particular for that user, and such tendencies or habits may be distinguishable from other users. Accordingly, a system may include a memory (e.g., memory 108, 214, and/or 220) that stores historical data for a number (e.g., tens, hundreds, thousands or more) of individual users. Such data may be used by the system in a process to identify (or help to identify) a user. Such a process may be useful to disambiguate in situations that involve, for example, multiple users on a single touchscreen. The data may originate, at least in part, from kinematic and identification data provided to the system by UWDs worn by the individual users during previous (historical) touch events. For each user, for example, the historical data may include, among other things, such UWD-provided data, position and timing of touch events measured by a touchscreen, and correlation among the UWD-provided data and such touchscreen-measured data. The historical data may also include information regarding devices involved in the touch events. Historical data may reach back by a few seconds up to months or years, for example. In some implementations, historical data may be used to modify detection thresholds (e.g., DT 332).

In some examples, machine learning processes may be applied to historical data. For example, a system using results of such machine learning may learn habits or tendencies of a user over time and/or during interaction between one or more touchscreens and the user. In other examples, a system using results of machine learning may learn habits or tendencies of multiple users and their interactions with one another and one or more touchscreens.

Figure 10:
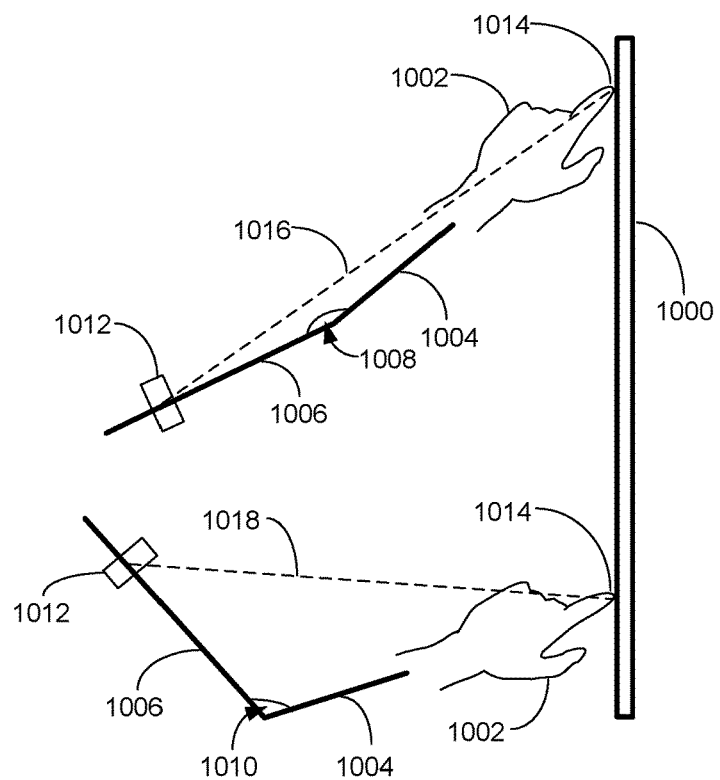
FIG. 10 illustrates two examples of arm extension lengths during touch events.

FIG. 10 illustrates two examples of arm extension lengths during touch events for a touchscreen 1000. In the top example, a user's arm/hand 1002 has a relatively extended configuration so that the forearm 1004 and the upper arm 1006 are bent with a relatively large angle 1008 with respect to each other. In the bottom example, the user's arm/hand 1002 has less of an extended configuration where the forearm 1004 and the upper arm 1006 are bent with a relatively small angle 1010 with respect to each other. In some cases, the upper example (extended configuration) may occur if the user is initiating a touch event relatively far from the user so that the user has to reach.

An acceleration pulse of a touch event initiated by an arm/hand may depend, at least in part, on extension lengths of the arm/hand as it approaches (and touches) a touchscreen. For example, kinematics of arm/hand 1002 in the bottom and top examples may be different from one another. Such differing kinematics may lead to differing acceleration pulses. Such kinematics may be measured by a UWD 1012 worn on arm/hand 1002. As discussed above, a user may have tendencies or habits that are particular for that user, and such tendencies or habits may be distinguishable from other users. Such tendencies or habits may involve arm extension, height of the user, location of a touch event on touchscreen 1000 (e.g., a location that is high relative to the user's height), type of touchscreen, and orientation of the touchscreen (e.g., vertical or horizontal), for example.

In some examples, kinematics (e.g., motion) of UWD 1012 may be different from kinematics of arm/hand 1002. In the examples illustrated in FIG. 10, such a difference may arise from, among other things, a displacement between a portion 1014 (e.g., fingertip) of arm/hand 1002 that initiates a touch event and the location of UWD 1012. Kinematics may also differ because of dynamics of arm/hand 1002 as the user moves the arm/hand and/or performs shoulder rotation, and so on.

Displacement 1016 in the top example may be greater than displacement 1018 in the bottom example, primarily because of the difference in arm extension. Here, in these examples, displacement is the distance between fingertip and UWD. Displacement may also be affected by location of the UWD on the arm/hand. Nevertheless, kinematics of the UWD, though possibly not identical to kinematics of the portion of the arm/hand initiating the touch event, may correspond to the kinematics of the portion of the arm/hand initiating the touch event.

Figure 11:
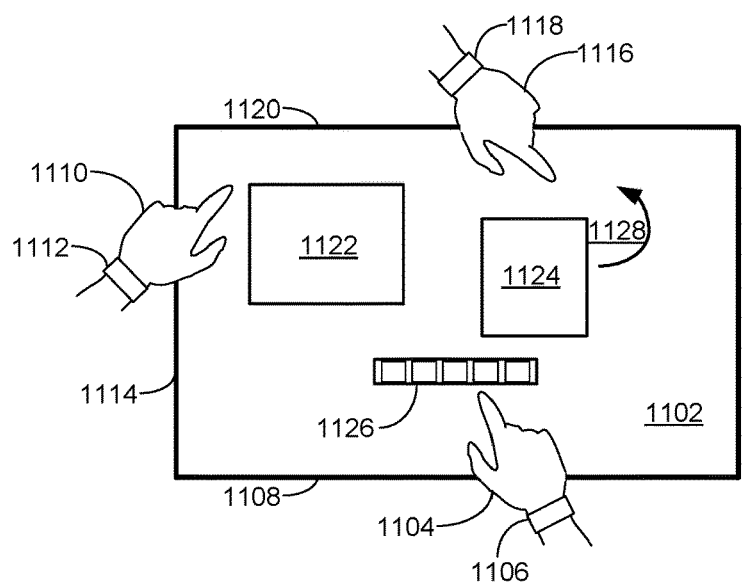
FIG. 11 illustrates one or more users interacting with example displayed objects on a tabletop touchscreen.

FIG. 11 illustrates one or more users interacting with example displayed objects on a touchscreen 1102, which may be a tabletop touchscreen mounted horizontally, for example. A number of users may interact with touchscreen 1102 and initiate multiple touch events. In some cases such touch events may involve physical contact with the surface of the touchscreen, and in other cases such touch events need not involve physical contact but may instead involve hover events (e.g., hand motion above and adjacent to the surface of the touchscreen). Arm/hand 1104 of a first user, which may be wearing a UWD 1106, may be interacting with touchscreen 1102 on an edge 1108 of the touchscreen. Arm/hand 1110 of a second user, which may be wearing a UWD 1112, may be interacting with touchscreen 1102 on an edge 1114 of the touchscreen. Arm/hand 1116 of a third user, which may be wearing a UWD 1118, may be interacting with touchscreen 1102 on an edge 1120 of the touchscreen. Less or more users may be present, and claimed subject matter is not limited in this respect.

Display 1102 includes displayed objects 1122, 1124, and 1126, each which may comprise windows, menus, text, drawings, icons, images, and so on.

In some examples, a system may detect where a particular user is sitting at touchscreen 1102 using information provided by a UWD worn by the user (and/or by UWDs worn by other users). For example, if the first user touches touchscreen 1102 and initiates a touch event, characteristics of a resulting acceleration pulse measured by UWD 1106 at the time of the touch may depend, at least in part, on how arm/hand 1104 is extended, as described above with regard to FIG. 10, for instance. Such characteristics may allow a system to distinguish among other users that may be facing the first user. In other examples, the orientation of individual UWDs relative to orientation of touchscreen 1102 may be used to determinate where a user (wearing a UWD) is sitting. In still other examples, each user may have a particular way to approach and touch a display, as explained above. Accordingly, characteristics of acceleration pulses for historical events associated with individual users may be stored as data in memory (e.g., as a table or lookup table such as 900) and such data may be dynamically used upon or after touch event to identify a particular user and to determine a relative location of the user with respect to orientation of touchscreen 1102.

In some examples, the system may determine orientation and location of users with respect to touchscreen 1102 and may use such a determination to orient displayed objects relative to the orientation and location of the users. For example, a system may rotate and/or align object 1124 (as indicated by arrow 1128) with respect to the third user upon or after determining the third user is interacting with touchscreen 1102 from edge 1120.

In some cases, several users may be collaborating on a flat display table (e.g., touchscreen 1102). The users may have respective displayed objects facing them, but all the labels of the shared workspace (e.g., a shared map) may face a specific user. A gesture by any of arms/hands 1104, 1110, and 1116 may rotate the labels toward another of the users. A user may perform a rotation gesture, such as tap with an arm/hand, that automatically rotates one or more of the displayed objects toward that user. In another example, a rotation gesture may spring back to its initial orientation if a particular user removes a touch (e.g., leaves the touchscreen region, changes positions, etc.).

In some examples, a system may detect orientation of a touchscreen, such as 1000 or 1102 using a UWD worn by a user. Generally, touchscreens may be positioned horizontal, angled, or vertical. User experience for each scenario may be different. Thus, it may be useful for a system to know the orientation of the touchscreen so as to generate and provide an appropriate experience. In some systems, a touchscreen may include an embedded IMU, which may be used by the system to determine touchscreen orientation. In other systems, the touchscreen does not include an IMU. For such systems, a UWD worn by a user initiating a touch event by touching a touchscreen may provide data to a processor regarding orientation of the UWD at the time of (or just before) the touch. The processor may use such data to infer the orientation of the display. In some implementations, a detection threshold, signal shape, among other things, used to detect a user and arm/hand based on measurements by the UWD may depend, at least in part, on the orientation of the display.

In some examples, a processor of a system may use recent historical events to distinguish among users if they touch a touchscreen at the same time. If two or more users touch a touchscreen (e.g., such as a relatively large touchscreen), for example, at the same time, respective UWDs worn by the users may register indicate that the users touched the touchscreen, but information about which touch corresponds to which user may not be inferred. In some implementations, a system may determine the user for each touch event by using stored data about recent touch events. For a particular numerical example, recent historical data may show that five seconds ago a first user performed a touch event on the left side of a touchscreen and seven seconds ago a second user performed a touch event on the right side of the touchscreen. If the first user and the second user subsequently touch the touchscreen at the same time, the processor may infer that the leftmost touch event corresponds to the first user, and the rightmost touch event corresponds to the second user. In other words, a processor may distinguish among two or more users based on history of time and position of touch events performed by the users. The system may also use the history in combination with other information (e.g., orientation of a UWD) to infer the user for each touch.

Figure 12:
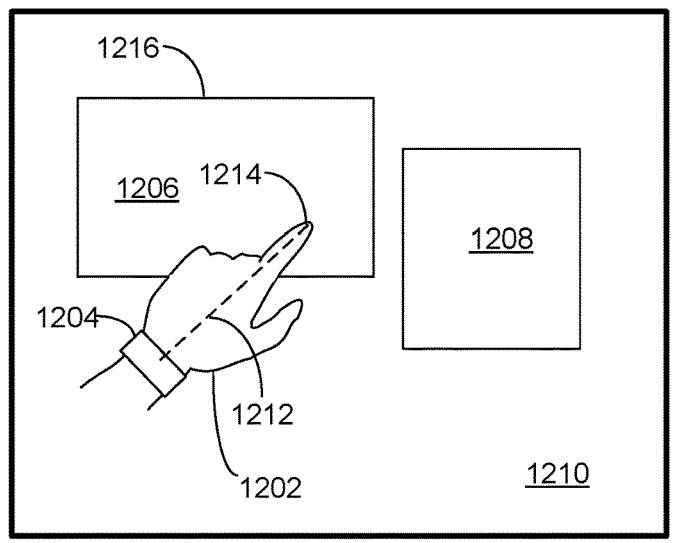
FIG. 12 illustrates an arm/hand of a user wearing a UWD and interacting with example displayed objects on a touchscreen.

FIG. 12 illustrates an arm/hand 1202 of a user wearing a UWD 1204 and interacting with example displayed objects 1206 and 1208 on a touchscreen 1210. In some examples, UWD 1204 may include a sound and/or vibration generating device, such as a haptic device, that may alert the user (and/or other users) if arm/hand 1202 has entered or exited particular regions. A displacement 1212 between UWD 1204 and a fingertip 1214 (or multiple fingers), which is considered to be the portion of arm/hand 1202 that performs touch events in the present example, may be considered by a processor in a process of determining location of the fingertip relative to the displayed objects.

For example, displayed object 1206 may be a window having an edge 1216. If a user moves fingertip 1214 past edge 1216, UWD may perform a haptic alert. A system may be configurable so that the UWD may generate an alert for various situations, such as an alert while fingertip 1214 is within edge 1216, an alert if fingertip 1214 moves beyond a threshold distance from edge 1216, an alert if fingertip 1214 moves into a region of object 1208, and so on. Such alerts may be useful for visually-impaired users, for example.

Figure 13:
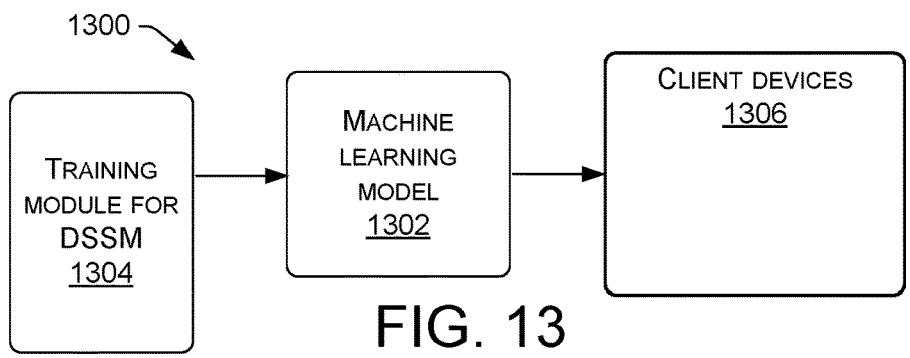
FIG. 13 is a block diagram of an example machine learning system.

FIG. 13 is a block diagram of a machine learning system 1300, according to various examples. Machine learning system 1300 includes a machine learning model 1302, a training module 1304, and a number of client devices 1306, any of which may access one or more databases. Machine learning model 1302 may receive training data from online and offline training module 1304. For example, training data can include data from a population, such as a population of elements in a database. A training system, for example, may be the same as or similar to training module 1304. Data from the population may be used to train machine learning model 1302. Subsequent to such training, machine learning model 1302 can be employed in systems 1306, which may be the same as or similar to system 100 or 200. Thus, for example, training using the data from the population for online or offline training can act as initial conditions for the machine learning model. Other techniques for training, such as those involving virtual evidence, described below, may be used. Information exchange between a UWD and other portions of a system such as 200 may be used as training data. As a result, the system may learn and improve accuracy of determining user motion based on motion measurements by UWD, for example. For example, some relatively complicated determinations may involve how a particular user's right hand motion affects the user's left hand motion (or vice versa). Machine learning may be useful for such situations where relatively many variables are involved in making determinations.

Figure 14:
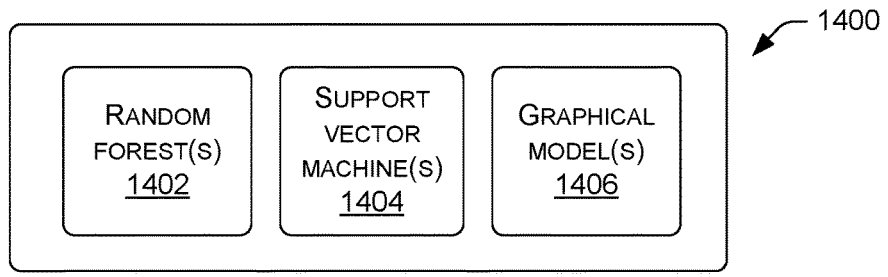
FIG. 14 is a block diagram of example machine learning models.

FIG. 14 is a block diagram of a machine learning model 1400, according to various examples. Machine learning model 1400 may be the same as or similar to machine learning model 1302 shown in FIG. 13. Machine learning model 1400 includes any of a number of functional blocks, such as random forest block 1402, support vector machine block 1404, and graphical models block 1406, which may be applied to a deep neural network model, for example. Random forest block 1402 can include an ensemble learning method for classification that operates by constructing decision trees at training time. Random forest block 1402 can output the class that is the mode of the classes output by individual trees, for example. Random forest block 1402 can function as a framework including several interchangeable parts that can be mixed and matched to create a large number of particular models. Constructing a machine learning model in such a framework involves determining directions of decisions used in each node, determining types of predictors to use in each leaf, determining splitting objectives to optimize in each node, determining methods for injecting randomness into the trees, and so on.

Support vector machine block 1404 classifies data for machine learning model 1400. Support vector machine block 1404 can function as a supervised learning model with associated learning algorithms that analyze data and recognize patterns, used for classification and regression analysis. For example, given a set of training data, each marked as belonging to one of two categories, a support vector machine training algorithm builds a machine learning model that assigns new training data into one category or the other.

Graphical models block 1406 functions as a probabilistic model for which a graph denotes conditional dependence structures between random variables. Graphical models provide algorithms for discovering and analyzing structure in distributions and extract unstructured information.

Figure 15:
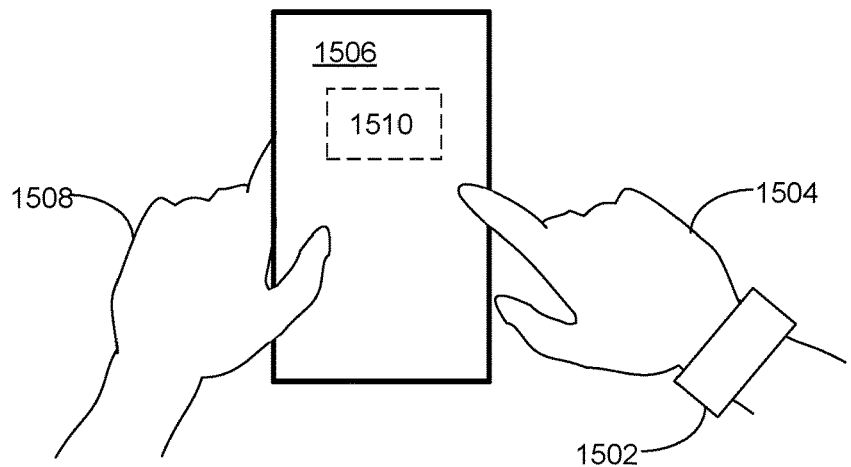
FIG. 15 illustrates a UWD worn by a user and interactions with an example handheld touchscreen.

FIG. 15 illustrates a UWD 1502 worn by a user on arm/hand 1504, which is interacting with a handheld touchscreen 1506. The user is using the hand 1508 opposite arm/hand 1504 to hold touchscreen 1506. Generally, a user initiates touch events on a touchscreen using thumbs while holding onto the touchscreen with the remainder of the hands. On the other hand, often a user will hold the touchscreen with one hand and operate (e.g., initiate touch events by touching) the touchscreen with the opposite hand, the situation which is illustrated in FIG. 15.

In some examples, touchscreen 1506 includes an IMU 1510 that measures kinematics (e.g., velocity, acceleration, and/or position) of touchscreen 1506. UWD 1502 also includes an IMU, as described above. A processor, which may be part of a system that includes the touchscreen, the UWD, or both, may determine if a thumb of either hand or a finger(s) of the non-holding hand touch the touchscreen to initiate a touch event. Such a determination may be made by comparing kinematic measurements of touchscreen 1506 collected by IMU 1510 with kinematic measurements of arm/hand 1504 collected by the IMU of UWD 1502. For example, if touch events (e.g., touches on touchscreen 1506) correspond to downward motion measured by the IMU of UWD 1502, then the processor may infer that finger(s) of arm/hand 1504, which is not holding touchscreen 1506, initiated the touch events. On the other hand, if touch events (e.g., touches on touchscreen 1506) correspond to downward motion measured by IMU 1510 of touchscreen 1506, then the processor may infer that the thumb of arm/hand 1508, which is holding touchscreen 1506, initiated the touch events. In another example, the IMU of UWD 1502 may measure kinematics that indicate that arm/hand is rotated in such a way as to allow the thumb of arm/hand 1504 to touch touchscreen 1506. In this case, if touch events (e.g., touches on touchscreen 1506) correspond to downward motion measured by the IMU of UWD 1502, then the processor may infer that the thumb of arm/hand 1504, which may or may not be holding touchscreen 1506, initiated the touch events.

In some examples, UWD 1502 may be worn on the hand holding the handheld touchscreen 1506 (typically non-dominant hand) and detect the difference between the thumb of the non-dominant hand touching the handheld touchscreen (e.g., to navigate a map) and the index finger of the dominant hand touching the handheld touchscreen (e.g., to trace on the map). Such detection may be based, at least in part, on the sensor of the UWD (and could be combined with sensors on the handheld touchscreen, for example).

Figure 16:
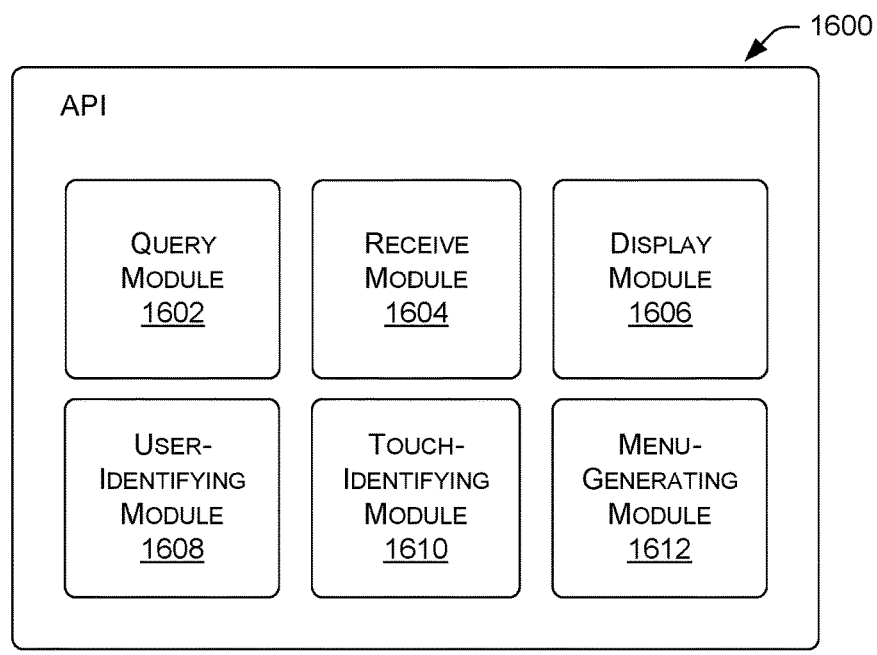
FIG. 16 is a block diagram of an example application programming interface.

FIG. 16 is a block diagram of an example API 1600. For example, API 1600 may be the same as or similar to API 226, illustrated in FIG. 2. API 1600 may include any of a number of modules (e.g., segments or portions of code) that include one or more executable instructions for implementing specific logical functions or elements associated with interfacing between, for example, a touchscreen and a UWD. In some examples, API 1600 may include a query module 1602 to query, in response to a touch event (such as on a touch surface (e.g., touchscreen display)), a UWD for kinematic data of the UWD as measured by the UWD during the touch event. In some examples, the UWD may be streaming data comprising accelerometer and/or gyroscope information to a system at least partially controlling a touchscreen display of one or more touch events. A module, such a query module 1602, may search for a possible spike in the streaming data in response to a touch down event. Kinematic data may include acceleration data, velocity data, and position or orientation data for the UWD. Such kinematic data (e.g., an acceleration profile, etc.) may be used to determine which part (e.g., dominant or non-dominant hand, one finger, multiple fingers, and so on) of a user performed the touch event. In some examples, the number of fingers in physical contact with a touchscreen display may be determined directly by a digitizer of a touchscreen display (e.g., number of touch down or touch move events having different identifications), although the signal in an accelerometer and/or a gyroscope may depend, at least partially, on how many fingers touch the touchscreen display. In some examples, query module 1602 may perform the query if the UWD is within a threshold distance from the display surface (e.g., such as for a hover event).

Query module 1602 may additionally be configured to query the UWD for identification of the UWD. For example, upon occurrence of a touch event, query module 1602 may transit a request to the UWD for kinematic data and/or identification of the UWD, such as a GUID, MAC address, or other unique identifier.

A receive module 1604 may receive (e.g., via transmitter/transceiver 224, illustrated in FIG. 2) the kinematic data or the identification of the UWD. A display module 1606 may generate a displayed reaction to the touch event based, at least in part, on the received kinematic data. For example, in the case where kinematic data is used to determine which part of a user performed the touch event, display module 1606 may provide a first set of instructions for responding to the touch event if the UWD is worn on the arm that performed the touch event or provide a second set of instructions for responding to the touch event if the UWD is worn on the arm opposite to the arm that performed the touch event.

A user-identifying module 1608 may, in some examples, identify a user wearing the UWD based, at least in part, on the identification of the UWD. For example, user-identifying module 1608 may search for a match of the identification of the UWD in a look-up table that includes corresponding user information. User-identifying module 1608 may determine the identification of the user wearing the UWD based, at least in part, on the searching. In other examples, identification may be performed using vision that is based on a camera linked to a system controlling the touchscreen display. In some examples, display module 1606 may modify a set of instructions for responding to the touch event based, at least in part, on the identification of the user. In some examples, user-identifying module 1608 may be configured to access the Cloud to identify the user and/or collect information about the user wearing the UWD based, at least in part, on the identification of the UWD.

A touch-identifying module 1610 may determine whether a dominant hand or a non-dominant hand of the user performed the touch event. Such a determination may be based, at least in part, kinematic data (e.g., an acceleration profile, etc.). Touch-identifying module 1610 may determine which part (e.g., dominant or non-dominant hand, one finger, multiple fingers, and so on) of a user performed the touch event. For example, touch-identifying module 1610 may determine, based at least in part on a look-up table, placement information regarding whether the UWD is worn on a dominant hand of the user or a non-dominant hand of the user. Such placement information may be included in the look-up table that correlates UWD identification with personal information of users wearing respective UWDs, for example. Touch-identifying module 1610 may determine, based at least in part on acceleration data and the placement information, if the dominant hand of the user produced the touch event or if the non-dominant hand of the user produced the touch event.

A menu-generating module 1612 may generate custom menus on a display based, at least in part, on the identity of the user. For example, if a particular user is determined to have touched the touchscreen, then a menu that is customized or based on most-recently-used commands and tools by the particular user may be generated and subsequently displayed. In another example, if a dominant hand of a user is determined to have touched the touchscreen, then menu-generating module 1612 may resultantly generate one or more menus different from the case where the non-dominant hand was determined to have touched the touchscreen. In yet another example, if the intensity (e.g., touch impact—how hard the user touched the screen) is determined (or detected) to be above a particular threshold, then menu-generating module 1612 may resultantly generate one or more menus different from the case where the intensity is determined (or detected) to be below the particular threshold. In yet another instance, there might be more than one threshold.

In some examples, menu-generating module 1612 may comprise an API that may be at any of a number of layers. In some examples, such an API may operate to obtain information about a user and the user's hands, etc., while another module, which could be in a layer above this API, may operate to generate menus and display, etc. based, at least in part, on the user and hand information of the user. In some examples, an API may be generic and not only handle hand and user detection using a band or UWD, but may use other technologies, such as fingerprint detection. Such an API may encapsulate any of a number of details and complexities. Also, applications consuming such an API may seamlessly work on future platforms using detection technologies that are feasible in the future.

Figure 17:
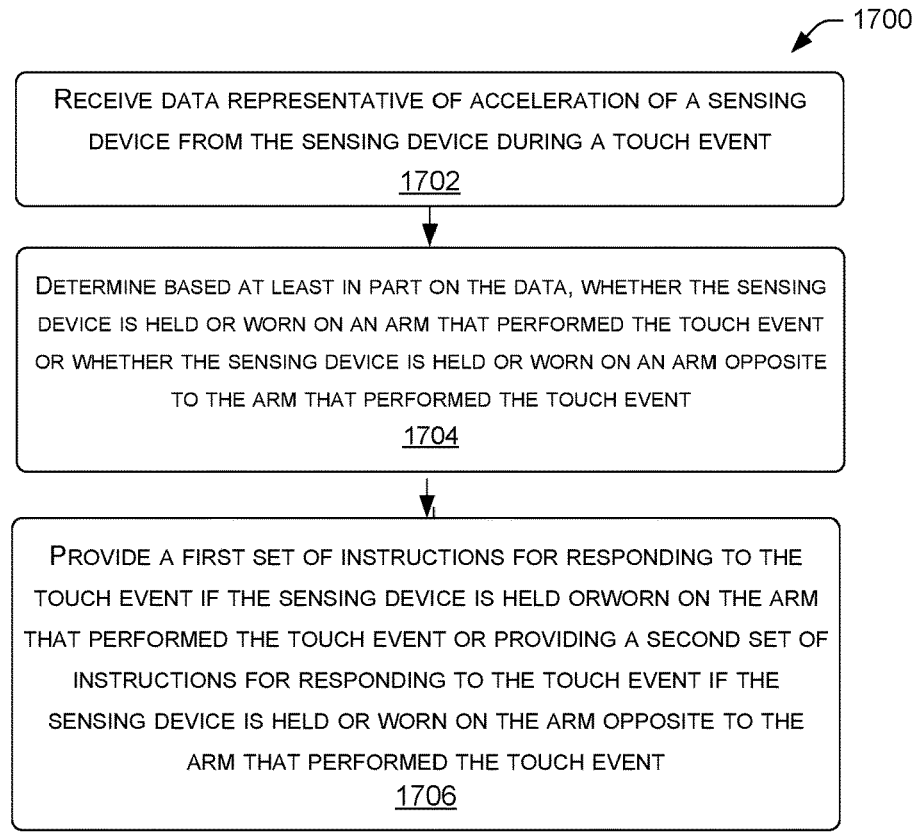
FIG. 17 is a flow diagram of an example process for responding to a touch event.
Figure 18:
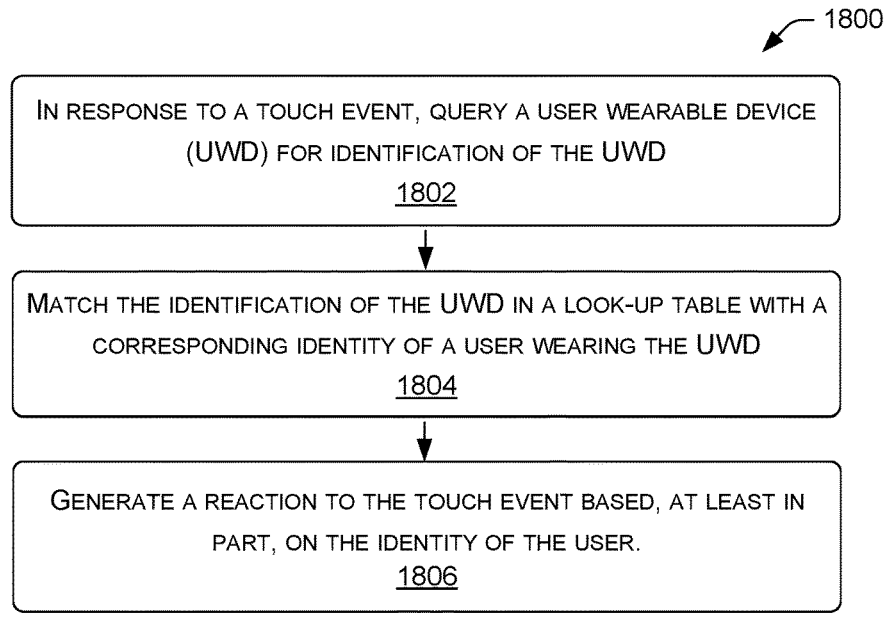
FIG. 18 is a flow diagram of an example process for responding to a touch event in view of an identified user.

The flow of operations illustrated in FIGS. 17 and 18 are illustrated as a collection of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, configure the processor to perform the recited operations. In the context of hardware, the blocks may represent one or more circuits (e.g., FPGAs, application specific integrated circuits—ASICs, etc.) configured to execute the recited operations.

Any routine descriptions, elements, or blocks in the flows of operations illustrated in FIGS. 17 and 18 may represent modules, segments, or portions of code that include one or more executable instructions for implementing specific logical functions or elements in the routine.

FIG. 17 is a flow diagram of an example process 1700 that may be performed by a processor. For example, process 1700 may be performed by computing device 102, illustrated in FIG. 1. At block 1702, the processor may receive data representative of acceleration of a sensing device (e.g., UWD) from the sensing device during a touch event, which may occur on a touchscreen, for example. At block 1704, the processor may determine, based at least in part on the data, whether the sensing device is held or worn on an arm that performed the touch event or whether the sensing device is held or worn on an arm opposite to the arm that performed the touch event. At block 1706, the processor may provide a first set of instructions for responding to the touch event if the sensing device is held or worn on the arm that performed the touch event or providing a second set of instructions for responding to the touch event if the sensing device is held or worn on the arm opposite to the arm that performed the touch event. In some examples, the first set of instructions for responding to the touch event may be associated with a dominant hand of the user and the second set of instructions for responding to the touch event may be associated with a non-dominant hand of the user. In some implementations, the processor may modify the first set of instructions or the second set of instructions based, at least in part, on information regarding whether the UWD is worn on a dominant hand of the user or a non-dominant hand of the user.

In some examples, the processor may determine an intensity-time profile of acceleration (and/or data profiles of other types of sensors) of the sensing device from the data representative of acceleration of the sensing device and, based at least in part on the intensity-time profile of the acceleration, to determine whether one finger or more than one finger of a user produced the touch event.

FIG. 18 is a flow diagram of an example process 1800 for responding to a touch event in view of an identified user. Process 1800 may be performed by a processor. For example, process 1800 may be performed by computing device 102, illustrated in FIG. 1. At block 1802, the processor may, in response to a touch event, query a UWD (or held device) for identification of the UWD, which may comprise a GUID, for example. At block 1804, the processor may match the identification of the UWD in a look-up table with a corresponding identity of a user wearing the UWD. The look-up table may include, among other things, data representative of historical touch events performed by the user. A look-up table may be in the UWD and/or may be in the Cloud, for example. In some examples, a duplicate of a look-up table (or a portion thereof) in the Cloud may reside in the UWD so as to allow the processor to react quickly (e.g., avoiding communications to/from the Cloud) or to allow the process to work even if internet or remote communications are not working, for example.

At block 1804, the processor may generate a reaction to the touch event based, at least in part, on the identity of the user. Such a reaction may include, for example, displaying a custom menu on a display based, at least in part, on the identity of the user. For example, if a particular user is determined to have touched the touchscreen, then a menu that is customized or based on most-recently-used commands and tools by the particular user may be generated and subsequently displayed.

In some examples, the processor may, in response to the touch event, query the UWD for acceleration data of the UWD as measured by the UWD during the touch event. The acceleration data may accompany identification of the UWD. The processor may subsequently determine, based at least in part information in the look-up table, placement information regarding whether the UWD is worn on a dominant hand of the user or a non-dominant hand of the user. The processor may determine, based at least in part on (i) the acceleration data and (ii) the placement information (e.g., on which hand or arm the UWD is worn), if the dominant hand of the user produced the touch event or if the non-dominant hand of the user produced the touch event.

EXAMPLE CLAUSES

The following clauses describe multiple possible embodiments for implementing the features described in this disclosure. The various embodiments described herein are not limiting nor is every feature from any given embodiment required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

A. A system comprising: one or more processors; and a memory storing instructions that, when executed by the one or more processors, cause the one or more processors to perform operations comprising: receiving data representative of acceleration of a sensing device from the sensing device during a touch event; determining, based at least in part on the data, whether the sensing device is held or worn on an arm that performed the touch event or whether the sensing device is held or worn on an arm opposite to the arm that performed the touch event; and providing a first set of instructions for responding to the touch event if the sensing device is held or worn on the arm that performed the touch event or providing a second set of instructions for responding to the touch event if the sensing device is held or worn on the arm opposite to the arm that performed the touch event.

B. The system as paragraph A recites, further comprising a touchscreen, wherein the operations further comprise receiving the touch event on the touchscreen.

C. The system as paragraph A recites, the operations further comprising: receiving an identification of the sensing device before or during the touch event; searching for the identification of the sensing device in a look-up table; determining an identification of a user based, at least in part, on the searching; and modifying the first set of instructions or the second set of instructions based, at least in part, on the identification of the user.

D. The system as paragraph C recites, wherein the first set of instructions for responding to the touch event is associated with a dominant hand of the user and the second set of instructions for responding to the touch event is associated with a non-dominant hand of the user.

E. The system as paragraph C recites, wherein the operations further comprise: receiving information from a memory or from the sensing device regarding whether the sensing device is held or worn on a dominant hand of the user or a non-dominant hand of the user; and modifying the first set of instructions or the second set of instructions based, at least in part, on the information.

F. The system as paragraph A recites, the operations further comprising: determining an intensity-time profile of acceleration of the sensing device from the data representative of acceleration of the sensing device; and based, at least in part, on the intensity-time profile of the acceleration, determining whether one finger or more than one finger of a user produced the touch event.

G. A method comprising: in response to a touch event on a display surface, querying a user wearable device (UWD) that is within a threshold distance from the display surface for identification of the UWD; matching the identification of the UWD in a look-up table with a corresponding identity of a user; and generating a reaction on the display surface to the touch event based, at least in part, on the identity of the user.

H. The method as paragraph G recites, further comprising: in response to the touch event, querying the UWD for acceleration data of the UWD as measured by the UWD during the touch event; receiving the acceleration data; determining, based at least in part on the look-up table, placement information regarding whether the UWD is worn on a dominant hand of the user or a non-dominant hand of the user; and determining, based at least in part on (i) the acceleration data and (ii) the placement information, if the dominant hand of the user produced the touch event or if the non-dominant hand of the user produced the touch event.

I. The method as paragraph G recites, wherein the generating the reaction to the touch event is further based, at least in part, on whether the dominant hand of the user produced the touch event or the non-dominant hand of the user produced the touch event.

J. The method as paragraph G recites, further comprising: determining a shape of an acceleration pulse from the acceleration data, wherein the acceleration pulse represents a magnitude of an acceleration of the UWD as a function of time, and wherein the determining if the dominant hand of the user produced the touch event or if the non-dominant hand of the user produced the touch event is further based, at least in part, on a shape of the pulse.

K. The method as paragraph G recites, further comprising: storing at least a portion of the acceleration data and associating the stored acceleration data with the user; and accessing the stored acceleration data during a machine leaning process for determining behavior of the user during additional touch events.

L. The method as paragraph G recites, further comprising: storing at least a portion of the acceleration data and associating the stored acceleration data with the user; storing additional acceleration data of a second UWD of a second user and associating the stored additional acceleration data with the second user; and accessing the stored acceleration data and the stored additional acceleration data during a machine leaning process to determine whether the user or the second user produced the touch event.

M. The method as paragraph G recites, wherein the look-up table includes data representative of historical touch events performed by the user.

N. The method as paragraph G recites, wherein the identification of the UWD comprises a globally unique identifier (GUID).

O. The method as paragraph G recites, further comprising: in response to the touch event, querying the UWD for acceleration data measured by the UWD during the touch event; receiving the acceleration data; and determining a magnitude of force of the touch event based, at least in part, on the acceleration data, wherein the generating the reaction to the touch event is further based, at least in part, on the magnitude of force of the touch event.

P. An application programming interface comprising: a query module to query, in response to a touch event, a user wearable device (UWD) for kinematic data of the UWD as measured by the UWD during the touch event; a receive module to receive the kinematic data; and a display module to generate a displayed reaction to the touch event based, at least in part, on the received kinematic data.

Q. The application programming interface as paragraph P recites, wherein the query module is configured to query the UWD for identification of the UWD, the application programming interface further comprising: a user-identifying module to identify a user based, at least in part, on the identification of the UWD; and a touch-identifying module to determine whether a dominant hand or a non-dominant hand of the user performed the touch event.

R. The application programming interface as paragraph Q recites, further comprising: a menu-generating module to generate a custom menu based, at least in part, on the identity of the user.

S. The application programming interface as paragraph Q recites, wherein the user-identifying module is configured to access the Cloud to identify the user based, at least in part, on the identification of the UWD.

T. The application programming interface as paragraph P recites, wherein the kinematic data includes velocity data and orientation data of the UWD.

Although the techniques have been described in language specific to structural features and/or methodological acts, it is to be understood that the appended claims are not necessarily limited to the features or acts described. Rather, the features and acts are described as example implementations of such techniques.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "might" or "may," unless specifically stated otherwise, are used to indicate that certain examples include, while other examples do not include, the noted features, elements and/or steps. Thus, unless otherwise stated, such conditional language is not intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term. etc. may be either X, or Y, or Z, or a combination thereof.

Many variations and modifications may be made to the above-described examples, the elements of which are to be understood as being among other acceptable examples. All such modifications and variations are intended to be included herein within the scope of this disclosure.

What is claimed is:

1. A system comprising:
one or more processors; and
a memory storing instructions that, when executed by the one or more processors, cause the one or more processors to perform operations comprising:
receiving data representative of acceleration of a sensing device from the sensing device during a touch event;

generating an acceleration pulse from the data representative of the acceleration of the sensing device where the acceleration pulse represents acceleration as a function of time and has an amplitude and a width;

determining whether the amplitude of the acceleration pulse exceeds a first detection threshold and the width of the acceleration pulse is below a second detection threshold after the touch event has occurred;

where a determination is made that the amplitude of the acceleration pulse exceeds the first detection threshold and the width of the acceleration pulse is below a second detection threshold, determining that the sensing device is held or worn on an arm that performed the touch event;

where a determination is made that the amplitude of the acceleration pulse does not exceed the detection threshold and the width of the acceleration pulse is below a second detection threshold, determining that the sensing device is held or worn on an arm opposite to the arm that performed the touch event; and providing a first set of instructions for responding to the touch event if the sensing device is held or worn on the arm that performed the touch event or providing a second set of instructions for responding to the touch event if the sensing device is held or worn on the arm opposite to the arm that performed the touch event.

2. The system of claim 1, further comprising a touchscreen, wherein the operations further comprise receiving the touch event on the touchscreen.

3. The system of claim 1; the operations further comprising:
receiving an identification of the sensing device before or during the touch event;
searching for the identification of the sensing device in a look-up table;
determining an identification of a user based, at least in part, on the searching; and
modifying the first set of instructions or the second set of instructions based, at least in part, on the identification of the user.

4. The system of claim 3, wherein the first set of instructions for responding to the touch event is associated with a dominant hand of the user and the second set of instructions for responding to the touch event is associated with a non-dominant hand of the user.

5. The system of claim 3, wherein the operations further comprise:
receiving information from a memory or from the sensing device regarding whether the sensing device is held or worn on a dominant hand of the user or a non-dominant hand of the user; and
modifying the first set of instructions or the second set of instructions based, at least in part, on the information.

6. The system of claim 1, the operations further comprising:
based, at least in part, on the data representative of acceleration of the sensing device, determining whether one finger or more than one finger of a user produced the touch event.

7. A method comprising:
in response to a touch event on a display surface:
querying a user wearable device (UWD) that is within a threshold distance from the display surface for identification of the MD;
querying the UWD for acceleration data of the UWD as measured by the UWD during the touch event, wherein the acceleration data is representable as a pulse having a width and an amplitude:
receiving the acceleration data;
matching the identification of the UWD in a look-up table with a corresponding identity of a user;
determining, based at least in part on the look-up table, placement information regarding whether the UWD is worn on a dominant hand of the user or a non-dominant hand of the user;
determining, based at least in part on (i) whether the height of the pulse representing the acceleration data exceeds a first detection threshold and the width is below a second detection threshold after the touch event has occurred; and (ii) the placement information, if the dominant hand of the user produced the touch event or if the non-dominant hand of the user produced the touch event; and
generating a reaction on the display surface to the touch event based, at least in part, on the identity of the user.

8. The method of claim 7, wherein the generating the reaction to the touch event is further based, at least in part, on whether the dominant hand of the user produced the touch event or the non-dominant hand of the user produced the touch event.

9. The method of claim 7, further comprising:
determining a shape of an acceleration pulse from the acceleration data, wherein the acceleration pulse represents a magnitude of an acceleration of the UWD as a function of time, and wherein the determining if the dominant hand of the user produced the touch event or if the non-dominant hand of the user produced the touch event is further based, at least in part, on a shape of the pulse.

10. The method of claim 7, further comprising:
storing at least a portion of the acceleration data and associating the stored acceleration data with the user, and accessing the stored acceleration data during a machine learning process for determining behavior of the user during additional touch events.

11. The method of claim 7, further comprising:
storing at least a portion of the acceleration data and associating the stored acceleration data with the user, storing additional acceleration data of a second UWD of a second user and associating the stored additional acceleration data with the second user; and
accessing the stored acceleration data and the stored additional acceleration data during a machine learning process to determine whether the user or the second user produced the touch event.

12. The method of claim 7, wherein the look-up table includes data representative of historical touch events performed by the user.

13. The method of claim 7, wherein the identification of the ID comprises a globally unique identifier (GUID).

14. The method of claim 7, further comprising:
in response to the touch event, querying the MD for acceleration data measured by e UWD during the touch event;
receiving the acceleration data; and
determining a magnitude of force of the touch event based, at least in part, on the acceleration data, wherein the generating the reaction to the touch event is further based, at least in part, on the magnitude of force of the touch event.

15. A system comprising:
a memory storage device storing computer-executable instructions; and
one or more hardware processors that, having executed the computer-executable instructions, configure a system to implement an application programming interface, the application programming interface comprising:
  a query module to query, in response to a touch event, a user wearable device (UWD) for kinematic data of the UWD as measured by the UWD during the touch event, the kinematic data including acceleration data of the UWD, the acceleration data corresponding to an acceleration pulse representing acceleration as a function of time and having a width and an amplitude;
  a receive module to receive the kinematic data;
  a touch-identifying module to determine whether the UWD is held or worn on an arm that performed the touch event based, at least in part, on whether the amplitude of the acceleration pulse exceeds a first detection threshold and the width of the acceleration pulse is below a second detection threshold after the touch event has occurred; and
  a display module to generate a displayed reaction to the touch event based, at least in part, on the determination performed by the touch-identifying module.

16. The system of claim 15, wherein:
the query module is configured to query the UWD for identification of the UWD; and
the application programming interface further comprises:
  a user-identifying module to identify a user based, at least in part, on the identification of the UWD.

17. The system of claim 16, wherein the application programming interface further comprises:
  a menu-generating module to generate a custom menu based, at least in part, on the identity of the user.

18. The system, of claim 16, wherein the user-identifying module is configured to access the Cloud to identify the user based, at least in part, on the identification of the UWD.

19. The system of claim 15, wherein the kinematic data includes velocity data and orientation data of the UWD.

* * * * *